United States Patent

Satterfield

(10) Patent No.: US 9,108,186 B2
(45) Date of Patent: Aug. 18, 2015

(54) PHOSPHORIC ACID TREATMENT OF CARBONACEOUS MATERIAL PRIOR TO ACTIVATION

(71) Applicant: Cabot Corporation, Boston, MA (US)

(72) Inventor: John Michael Satterfield, Daingerfield, TX (US)

(73) Assignee: Cabot Corporation, Boston, MA (US)

( * ) Notice: Subject to any disclaimer, the term of this patent is extended or adjusted under 35 U.S.C. 154(b) by 200 days.

(21) Appl. No.: 13/790,124

(22) Filed: Mar. 8, 2013

(65) Prior Publication Data

US 2014/0208945 A1    Jul. 31, 2014

Related U.S. Application Data

(60) Provisional application No. 61/756,951, filed on Jan. 25, 2013.

(51) Int. Cl.
| | |
|---|---|
| *B01D 53/06* | (2006.01) |
| *B01J 20/30* | (2006.01) |
| *C01B 31/08* | (2006.01) |
| *C01B 31/10* | (2006.01) |

(52) U.S. Cl.
CPC ............ *B01J 20/3064* (2013.01); *B01D 53/06* (2013.01); *C01B 31/08* (2013.01); *C01B 31/10* (2013.01)

(58) Field of Classification Search
CPC ..... B01D 53/06; B01J 20/3064; C01B 31/08; C01B 31/10
See application file for complete search history.

(56) References Cited

U.S. PATENT DOCUMENTS

| | | | |
|---|---|---|---|
| 5,538,929 A | 7/1996 | Sudhakar et al. | |
| 6,537,947 B1 * | 3/2003 | Johns et al. | 502/416 |
| 2009/0201630 A1 * | 8/2009 | Yoshino et al. | 361/502 |

FOREIGN PATENT DOCUMENTS

| | | |
|---|---|---|
| EP | 2581341 A1 | 4/2013 |
| WO | WO 92/06919 | 4/1992 |

OTHER PUBLICATIONS

Nahil, Characterisation of Activated Carbons with Hugh Surface Area and Variable Porosity Produced from Agricultural Cotton Waste by Chemical Activation and Co-activation, Jun. 2012, Waste and Biomass Valorization (Abstract).*

Toles, et al., Production of Activated Carbons from a Washington Lignite Using Phosphoric Acid Activation, Carbon, vol. 34, Issue 11, 1996, p. 1419-1426.

Module 6: Air Pollutants and Control Techniques—Particulate Matter—Control Techniques, Basic Concepts in Environmental Sciences, APTI, USEPA, http://www.epa.gov/apti/bces/module6/matter/control/control.htm, retrieved Jun. 25, 2009.

Benaddi, et al., "Influence of the Atmosphere in the Chemical Activation of Wood by Phosphoric Acid", Carbon, Elsevier, Oxford, GB, vol. 36, No. 3, Jan. 1, 1998, pp. 306-309.

(Continued)

*Primary Examiner* — Christopher P Jones

(57) ABSTRACT

A method of producing an activated carbon, comprising selecting a raw material for direct-activation, applying a solution of at least 50% phosphoric acid by weight at a ratio of from 0.01 pounds to 0.3 pounds of phosphoric acid solution per pound to the raw material selected for direct activation to produce a phosphoric acid treated raw material, and direct-activating the phosphoric acid treated raw material via a gas activation process to produce an activated carbon.

10 Claims, 13 Drawing Sheets

(56) References Cited

OTHER PUBLICATIONS

Budinova, et al., "Characterization and Application of Activated Carbon Produced by $H_3PO_4$ and Water Vapor Activation", Elsevier, Fuel Processing Technology, vol. 87, No. 10, Oct. 1, 2006, pp. 899-905.

The International Search Report and the Written Opinion of the International Searching Authority, or the Declaration of International Patent Application No. PCT/US2014/013013, mailed on Apr. 10, 2014.

* cited by examiner

| | | | | |
|---|---|---|---|---|
| SAMPLE | 2-1 | 2-2 | 2-3 | 2-4 |
| % ACID DOSE | 0.0 | 2.5 | 5.0 | 10.0 |
| ACTIVATION YIELD (FROM RAW LIGNITE), Wt% | 6.8 | 16.5 | 24.7 | 27.9 |
| WATER SOLUBLES, Wt% | 3.96 | 0.40 | 0.34 | 1.62 |
| ASH, Wt% | 43.57 | 33.48 | 29.01 | 34.96 |
| MOLASSES RE, GROUND db | 147 | 21 | 13 | 24 |
| BPB NUMBER | 123 | 30 | 26 | 79 |
| IODINE NUMBER | 463 | 515 | 536 | 698 |

| SAMPLE | 3-1 | 3-2 | 3-3 | 3-4 | 3-5 | 3-6 |
|---|---|---|---|---|---|---|
| % ACID DOSE | 0.0 | 1.0 | 2.5 | 5.0 | 7.5 | 10.0 |
| ACTIVATION YIELD (FROM RAW LIGNITE), wt% | 15.2 | 16.5 | 20.1 | 24.2 | 28.5 | 26.1 |
| VIBRATING FEED DENSITY, g/ml db | 0.470 | 0.462 | 0.464 | 0.504 | 0.503 | 0.511 |
| ASH, wt% | 33.24 | 38.95 | 32.26 | 31.16 | 34.76 | 33.48 |
| pH | 11.6 | 11.1 | 9.6 | 7.8 | 6.0 | 5.1 |
| WATER SOLUBLES, wt% | 5.4 | 3.83 | 1.45 | 0.61 | 0.48 | 0.59 |
| PHOSPHATES, wt% | 0.59 | 0.03 | 0.00 | 0.00 | 0.21 | 0.39 |
| MOLASSES RE, GROUND db | 110 | 73 | 50 | 31 | 21 | 22 |
| BPB NUMBER | 106 | 78 | 62 | 69 | 71 | 101 |
| IODINE NUMBER | 464 | 440 | 496 | 633 | 670 | 798 |

FIG. 3A

| SAMPLE | 3-7 | 3-8 | 3-9 | 3-10 |
|---|---|---|---|---|
| % ACID DOSE | 0.0 | 5.0 | 7.5 | 10.0 |
| ACTIVATION YIELD (FROM RAW LIGNITE), wt% | 4.4 | 20.7 | 24.7 | 23.03 |
| VIBRATING FEED DENSITY. g/ml db | 0.649 | 0.437 | 0.454 | 0.467 |
| ASH, wt% | 75.29 | 41.63 | 35.81 | 40.90 |
| WATER SOLUBLES, wt% | 0.55 | 0.55 | 0.62 | 0.85 |
| MOLASSES RE, GROUND db | 53 | 52 | 36 | 41 |
| BPB NUMBER | 42 | 140 | 126 | 193 |
| IODINE NUMBER | 255 | 700 | 677 | 730 |

FIG. 3B

| SAMPLE | 3-11 | 3-12 | 3-13 | 3-14 |
|---|---|---|---|---|
| % ACID DOSE | 0.0 | 5.0 | 7.5 | 10.0 |
| ACTIVATION YIELD (FROM RAW LIGNITE), wt% | 3.5 | 17.4 | 19.2 | 18.4 |
| VIBRATING FEED DENSITY. g/ml db | 0.853 | 0.427 | 0.410 | 0.427 |
| ASH, wt% | 99.23 | 47.39 | 54.11 | 53.95 |
| WATER SOLUBLES, wt% | --- | 0.64 | 0.56 | 0.69 |
| MOLASSES RE, GROUND db | 27 | 97 | 113 | 98 |
| BPB NUMBER | 4 | 186 | 226 | 246 |
| IODINE NUMBER | 78 | 735 | 673 | 742 |

| | SAMPLE | 4-1 | 4-2 | 4-3 |
|---|---|---|---|---|
| 410 | CONCENTRATION OF HCl | -- | -- | 7% |
| 412 | DENSITY, VIBRATING FEED g/ml db | 0.411 | 0.427 | 0.314 |
| 414 | MOLASSES RE, GROUND db | 115 | 98 | 156 |
| 416 | BROMOPHENOL BLUE NUMBER | 102 | 246 | 323 |
| 418 | IODINE NUMBER | 592 | 742 | 924 |

| | SAMPLE | 4-4 | 4-5 |
|---|---|---|---|
| 460 | ACID SOLUBLE ASH, Wt% | 4.13 | 2.69 |
| 462 | WATER SOLUBLE CONTENT, Wt% | 2.87 | 0.26 |
| 464 | WATER SOLUBLE PHOSPHATES, Wt% | 1.39 | 0.10 |
| 466 | MOLASSES RE GROUND db | 175 | 204 |
| 468 | IODINE NUMBER | 818 | 1087 |
| 470 | BPB NUMBER | 219 | 386 |

| SAMPLE | 5-1 | 5-2 | 5-3 | 5-4 |
|---|---|---|---|---|
| KILN HOOD TEMPERATURE | T °C | (T−22) °C | (T−36) °C | (T−52) °C |
| % ACID DOSE | 8.3 | 8.4 | 8.9 | 6.3 |
| ACTIVATION YIELD, % | 11.5 | 11.6 | 15.4 | 12.7 |
| BPB NUMBER | 201 | 161 | 164 | 144 |
| IODINE NUMBER | 744 | 733 | 713 | 759 |

| 610 → | SAMPLE | 6-1 | 6-2 |
|---|---|---|---|
| 612 → | WATER SOLUBLES, % | 4.91 | 0.92 |
| 614 → | VFD, g/ml | 0.416 | 0.474 |
| 616 → | MOLASSES RE, db | 120 | 47 |
| 618 → | BPB NUMBER | 126 | 166 |
| 620 → | IODINE NUMBER | 591 | 742 |
| | ABRASION NUMBER | 62.5 | 96 |

| SAMPLE | 7-1 | 7-2 | 7-3 | 7-4 |
|---|---|---|---|---|
| % ACID DOSE | 0.0 | 5.0 | 7.5 | 10.0 |
| ACTIVATION YIELD (FROM "AS IS" FEEDSTOCK), wt% | 12.7 | 28.1 | 28.4 | 31.8 |
| VIBRATING FEED DENSITY, g/ml db | 0.356 | 0.588 | 0.555 | 0.576 |
| ASH, wt% | 57.11 | 41.75 | 33.47 | 35.09 |
| WATER SOLUBLES, wt% | 5.1 | 0.35 | 0.46 | 0.11 |
| MOLASSES RE, GROUND db | 147 | 15 | 18 | 15 |
| BPB NUMBER | 116 | 27 | 34 | 35 |
| IODINE NUMBER | 464 | 504 | 568 | 695 |

| LAB NUMBER | 8-1 | 8-2 |
|---|---|---|
| ACTIVATION YIELD (FROM "AS IS" FEEDSTOCK), Wt% | 31.8 | 18.7 |
| VIBRATING FEED DENSITY, g/ml db | 0.576 | 0.470 |
| ASH, Wt% | 35.09 | 61.07 |
| WATER SOLUBLES, Wt% | 0.11 | 0.73 |
| MOLASSES RE, GROUND db | 15 | 100 |
| BPB NUMBER | 35 | 230 |
| IODINE NUMBER | 695 | 709 |

FIG. 8

| SAMPLE | 9-1 | 9-2 |
|---|---|---|
| ASH, Wt% | 4.89 | 29.29 |
| AVG. ACID SOLUBLE ASH, % | 4.13 | 1.56 |
| AVG. ACID SOLUBLES, % | 3.37 | 3.81 |
| WATER SOLUBLES, Wt% | 2.87 | 0.51 |
| MOLASSES RE, GROUND db | 175 | 187 |
| IODINE NUMBER | 818 | 987 |
| BPB NUMBER | 219 | 377 |

FIG. 9

| SAMPLE | 10-1 | 10-2 | 10-3 |
|---|---|---|---|
| % ACID DOSE | 0 | 1 | 7.5 |
| MOLASSES RE | 74 | 79 | 113 |
| BPB | 78 | 79 | 226 |
| IODINE NUMBER | 488 | 521 | 673 |
| Hg CAPACITY (µg Hg/g AC) | 4500 | 6574 | 6033 |
| % IMPROVEMENT OVER SAMPLE E | 0% | 46% | 34% |

FIG. 10

| SAMPLE | 11-1 | 11-2 | 11-3 | 11-4 |
|---|---|---|---|---|
| % ACID DOSE | 0 | 1 | 2.5 | 5 |
| ACTIVATION YIELD, Wt% | 12.5 | 15.7 | 18.1 | 19.1 |
| IODINE NUMBER | 1083 | 1027 | 1057 | 1065 |
| METHYLENE BLUE | 0 | 15.8 | 16.2 | 18.2 |

PHOSPHORIC ACID TREATMENT OF CARBONACEOUS MATERIAL PRIOR TO ACTIVATION

CROSS REFERENCE TO RELATED APPLICATIONS

This patent application claims the benefit of U.S. Provisional Patent Application No. 61/756,951, filed Jan. 25, 2013, the entire contents of which are incorporated herein by reference.

TECHNICAL FIELD

The present disclosure relates to a treated and activated sorbent and, more particularly, to a method for treating and activating a sorbent.

BACKGROUND OF THE INVENTION

Activated carbon ("AC") may come from a plurality of sources. AC from certain sources may not have sufficient microporosity or mesoporosity to adsorb small molecular weight impurities. This may leave certain ACs at a disadvantage in applications that require removal of small molecular weight impurities.

SUMMARY OF THE INVENTION

According to embodiments of the present disclosure, disadvantages and problems associated with the performance of a sorbent may be reduced or eliminated.

In accordance with one embodiment, a method of producing an activated carbon comprises selecting a raw material for direct-activation, applying a solution of at least 50% phosphoric acid by weight at a ratio of from 0.01 pounds to 0.3 pounds of phosphoric acid solution per pound to the raw material selected for direct activation to produce a phosphoric acid treated raw material, and direct-activating the phosphoric acid treated raw material via a gas activation process to produce an activated carbon.

In accordance with another embodiment, the method of producing an activated carbon recited initially, wherein the raw material is selected from the group consisting of peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells.

In accordance with another embodiment, the method of producing an activated carbon recited initially, wherein the raw material comprises lignite.

In accordance with another embodiment, the method of producing an activated carbon recited initially, further comprising, after direct-activating the phosphoric acid treated raw material, washing the activated carbon with a solution comprising a second acid.

In accordance with another embodiment, the method of producing an activated carbon recited above, wherein the solution comprising the second acid comprises at least 1% hydrochloric acid by weight.

In accordance with another embodiment, the method of producing an activated carbon recited initially, wherein applying the solution of at least 50% phosphoric acid by weight at a ratio of from 0.01 pounds to 0.3 pounds of phosphoric acid solution per pound to the raw material comprises spraying the solution on the raw material.

In accordance with another embodiment, the method of producing an activated carbon recited initially, wherein the gas activation comprises exposing the raw material to steam at a temperature of at least 600° C.

In accordance with another embodiment, an activated carbon for the removal of an impurity, the activated carbon prepared by a process comprising selecting a raw material for direct-activation, applying a solution of at least 50% phosphoric acid by weight at a ratio of from 0.01 pounds to 0.3 pounds of phosphoric acid solution per pound to the raw material selected for direct activation to produce a phosphoric acid treated raw material, and direct-activating the phosphoric acid treated raw material via a gas activation process to produce an activated carbon.

In accordance with another embodiment, the activated carbon for the removal of an impurity, the activated carbon prepared by the process recited initially, wherein the raw material is selected from the group consisting of peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells.

In accordance with another embodiment, the activated carbon for the removal of an impurity, the activated carbon prepared by the process recited initially, wherein the raw material comprises lignite.

In accordance with another embodiment, the activated carbon for the removal of an impurity, the activated carbon prepared by the process recited initially, further comprising, after direct-activating the phosphoric acid treated raw material, washing the activated carbon with a solution comprising a second acid.

In accordance with another embodiment, the activated carbon for the removal of an impurity, the activated carbon prepared by the process recited above, wherein the solution comprising the second acid comprises at least 1% hydrochloric acid by weight.

In accordance with another embodiment, the activated carbon for the removal of an impurity, the activated carbon prepared by the process recited initially, wherein applying the solution of at least 50% phosphoric acid by weight at a ratio of from 0.01 pounds to 0.3 pounds of phosphoric acid solution per pound to the raw material comprises spraying the solution on the raw material.

In accordance with another embodiment, the activated carbon for the removal of an impurity, the activated carbon prepared by the process recited initially, wherein the gas activation comprises exposing the raw material to steam at a temperature of at least 600° C.

In accordance with another embodiment, a method for removing an impurity from a flue gas stream comprises injecting an activated carbon into a flue gas stream upstream from a collection device, the flue gas stream comprising at least one impurity suitable for adsorption, allowing sufficient residence time for adsorption of the at least one impurity onto the activated carbon, collecting in the collection device the activated carbon after the activated carbon has adsorbed the at least one impurity, and removing the activated carbon and the absorbed at least one impurity from the flue gas stream, wherein the activated carbon is prepared by a process comprising selecting a raw material for direct-activation, applying a solution of at least 50% phosphoric acid by weight at a ratio of from 0.01 pounds to 0.3 pounds of phosphoric acid solution per pound to the raw material selected for direct activation to produce a phosphoric acid treated raw material, and direct-activating the phosphoric acid treated raw material via a gas activation process to produce an activated carbon.

In accordance with another embodiment, the method for removing an impurity from a flue gas stream recited initially, wherein the raw material is selected from the group consisting of peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells.

In accordance with another embodiment, the method for removing an impurity from a flue gas stream recited initially, wherein the raw material comprises lignite.

In accordance with another embodiment, the method for removing an impurity from a flue gas stream recited initially, further comprising, after the activation process, washing the activated carbon with a solution comprising a second acid.

In accordance with another embodiment, the method for removing an impurity from a flue gas stream recited above, wherein the solution comprising the second acid comprises at least 1% hydrochloric acid by weight.

In accordance with another embodiment, the method for removing an impurity from a flue gas stream recited initially, wherein applying the solution of at least 50% phosphoric acid by weight at a ratio of from 0.01 pounds to 0.3 pounds of phosphoric acid solution per pound to the raw material comprises spraying the solution on the raw material.

In accordance with another embodiment, the method for removing an impurity from a flue gas stream recited initially, wherein the gas activation comprises exposing the raw material to steam at a temperature of at least 600° C.

In accordance with another embodiment, a system to remove an impurity from a flue gas stream comprises a flue gas stream comprising at least one impurity suitable for adsorption, an injection point operable to facilitate the injection of an activated carbon into a flue gas stream, the flue gas stream comprising at least one impurity suitable for adsorption, and a collection device operable to collect the activated carbon after the activated carbon has adsorbed the at least one impurity, and facilitate removal from the flue gas stream of the activated carbon and the absorbed at least one impurity, wherein the injection point is upstream from a collection device so as to allow for sufficient residence time for adsorption of the at least one impurity onto the activated carbon, and wherein the activated carbon is prepared by a process comprising: selecting a raw material for direct-activation, applying a solution of at least 50% phosphoric acid by weight at a ratio of from 0.01 pounds to 0.3 pounds of phosphoric acid solution per pound to the raw material selected for direct activation to produce a phosphoric acid treated raw material, and direct-activating the phosphoric acid treated raw material via a gas activation process to produce the activated carbon.

In accordance with another embodiment, the system to remove an impurity from a flue gas stream recited initially, wherein the raw material is selected from the group consisting of peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells.

In accordance with another embodiment, the system to remove an impurity from a flue gas stream recited initially, wherein the raw material comprises lignite.

In accordance with another embodiment, the system to remove an impurity from a flue gas stream recited initially, further comprising, after direct-activating the phosphoric acid treated raw material, washing the activated carbon with a solution comprising a second acid.

In accordance with another embodiment, the system to remove an impurity from a flue gas stream recited above, wherein the solution comprising the second acid comprises at least 1% hydrochloric acid by weight.

In accordance with another embodiment, the system to remove an impurity from a flue gas stream recited initially, wherein applying the solution of at least 50% phosphoric acid by weight at a ratio of from 0.01 pounds to 0.3 pounds of phosphoric acid solution per pound to the raw material comprises spraying the solution on the raw material.

In accordance with another embodiment, the system to remove an impurity from a flue gas stream recited initially, wherein the gas activation comprises exposing the raw material to steam at a temperature of at least 600° C.

In accordance with another embodiment, a method to produce lignite-based activated carbon comprises applying a solution of at least 50% phosphoric acid by weight at a ratio of from 0.01 pounds to 0.3 pounds of phosphoric acid solution per pound to the lignite to produce a phosphoric acid treated lignite, and activating the phosphoric acid treated lignite via a gas activation process, the gas activation comprising exposing the phosphoric acid treated lignite to steam at a temperature of at least 600° C., and optionally washing the resulting material with a solution comprising at least 1% hydrochloric acid by weight.

In accordance with another embodiment, a method to produce walnut shell-based activated carbon comprises applying a solution of at least 50% phosphoric acid by weight at a ratio of from 0.01 pounds to 0.3 pounds of phosphoric acid solution per pound to walnut shell pieces to produce phosphoric acid treated walnut shells, and activating the phosphoric acid treated walnut shells via a gas activation process, the gas activation comprising exposing the phosphoric acid treated walnut shells to steam at a temperature of at least 600° C., and optionally washing the resulting material with a solution comprising at least 1% hydrochloric acid by weight.

Certain embodiments of the present disclosure may provide one or more technical advantages. A technical advantage of certain embodiments may include increasing the adsorptive capacity characteristics of an AC. Increasing the adsorptive capacity characteristics, for example, increasing the microporosity or mesoporosity of the AC, may improve the performance such that the AC may be used in applications requiring microporosity and/or mesoporosity, such as applications requiring the removal of small molecular weight impurities. Using an AC treated in accordance with certain embodiments may have economic, processing, performance, logistical, safety, environmental, efficiency, sourcing, and/or other desirable advantages. An additional technical advantage of certain embodiments may be a reduction or elimination in facility corrosion or damage caused by phosphoric acid, and may additionally or alternatively provide additional economic, safety, logistical, or other advantages. An additional technical advantage of certain embodiments may be a reduction in facility infrastructure or operating costs, because raw materials treated with phosphoric acid that are commonly reagglomerated, such as coals, peat, wood chips, and waste tire, may not need to be ground and reagglomerated prior to activation.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure, its features and advantages, reference is now made to the following description, taken in conjunction with the accompanying drawings, in which:

FIGS. 3A, 3B, and 3C also illustrate the relationship between phosphoric acid treatment and Iodine Number in accordance with particular embodiments;

FIGS. 4A and 4B illustrate the relationship between a hydrochloric acid wash and Iodine Number in accordance with particular embodiments;

FIG. 6 also illustrates the relationship between phosphoric acid treatment and Iodine Number in accordance with particular embodiments;

FIG. 8 illustrates the influence of activation temperature for high ash lignite-based AC in accordance with particular embodiments;

FIG. 9 illustrates a comparison between wood based AC and phosphoric acid treated, lignite-based AC;

FIG. 10 illustrates the relationship between phosphoric acid treatment and mercury capacity in accordance with particular embodiments.

DETAILED DESCRIPTION

Figure 1A:
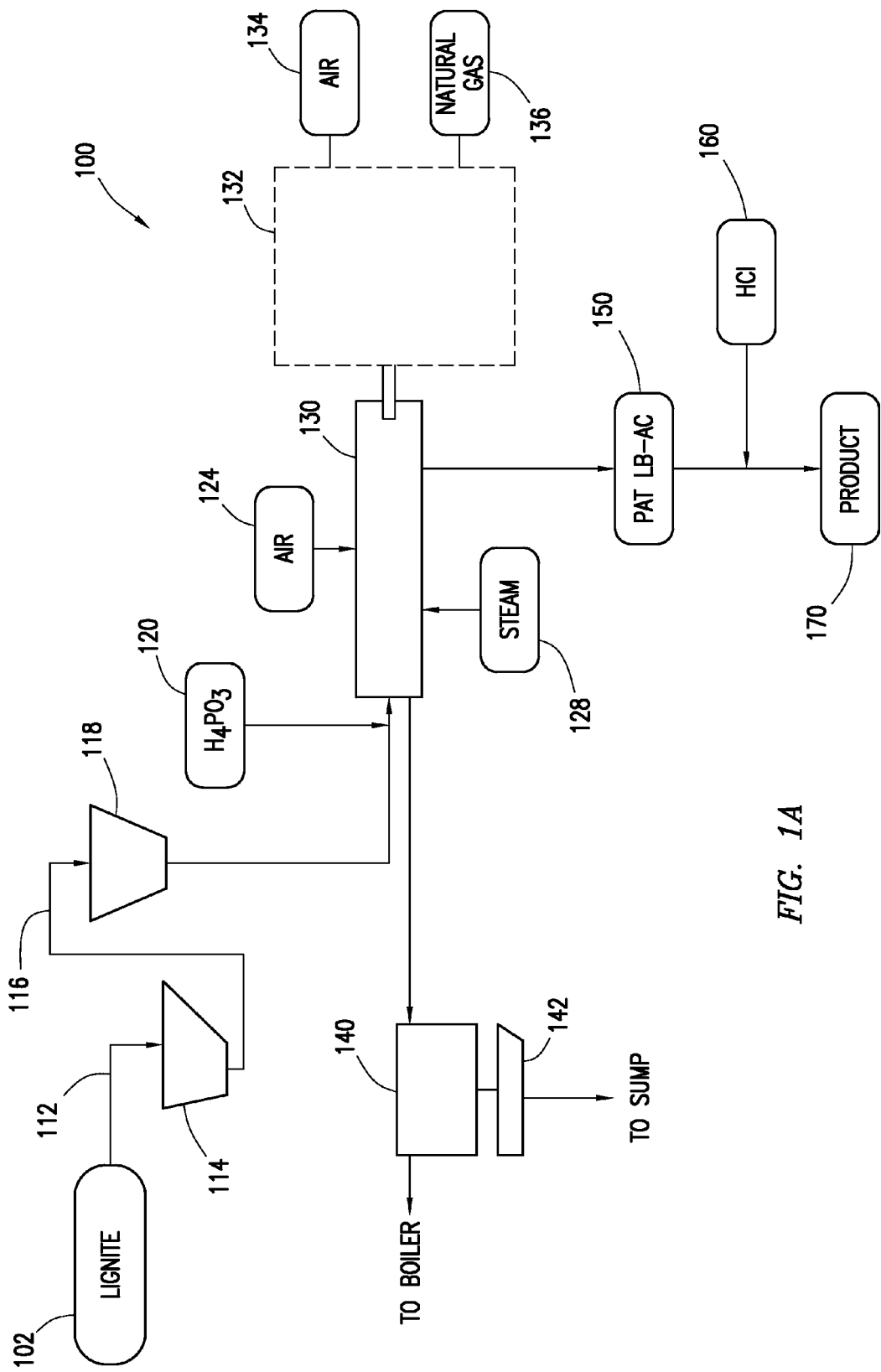
FIGS. 1A and 1B illustrate systems related to a sorbent treated with a phosphoric acid treatment in accordance with particular embodiments.

Embodiments of the present disclosure and its advantages are best understood by referring to FIGS. 1 through 11 of the drawings.

Sorbents may be used to adsorb liquids or gases. Activated carbon ("AC") is a commonly used sorbent. Raw material made to create AC may come from a plurality of sources. Certain raw materials may result in ACs with less microporosity and/or mesoporosity than other ACs, which may make these ACs with lesser microporosity and/or mesoporosity unlikely to be purchased for or used in applications requiring removal of small molecular weight impurities. Developing a method to increase the microporosity and/or mesoporosity of these ACs may reduce or eliminate this disadvantage and increase the marketability of ACs produced from these raw materials.

Phosphoric acid ($H_3PO_4$) treatment of a raw material before activation may be an effective means to increase microporosity or mesoporosity of the resulting AC, where increasing the microporosity increases the number of pores with a diameter of less than approximately 2 nanometers and increasing the mesoporosity increases the number of pores with a diameter between approximately 2 nanometers and 50 nanometers. In particular, treating a raw material prior to activation with small or low doses of phosphoric acid may alter its adsorptive capacity characteristics. Treating a raw material with a low dose of phosphoric acid in accordance with some embodiments may include applying a solution at a rate ranging from approximately 1% by weight to approximately 30% by weight (solution:raw material), where the solution contains from approximately 10 wt % phosphoric acid to approximately 100 wt % phosphoric acid, to the raw material prior to activation. This effect may be magnified when phosphoric acid treatment is combined with hydrochloric acid washing. Phosphoric acid treatment prior to activation may additionally allow any of these raw materials that commonly require or undergo agglomeration or grinding and reagglomeration prior to activation to be direct-activated, where the raw material enters a kiln for activation without being ground into powder and reagglomerated into pellets. Raw materials that may be appropriate for treatment with phosphoric acid may include, without limitation, peat, wood, lignocellulosic materials, biomass, waste, tire, corn hulls, rice hulls, petroleum coke, various coals, such as lignite, brown coal, anthracite coal, bituminous coal, and sub-bituminous coal, various nut-shells, such pecan shells and walnut shells, and material from various drupes, such as coconut shells, olive pits, and peach pits.

The micro- and mesoporosity of an AC are important for a variety of reasons. Physically, ACs adsorb impurities by van der Waals force or London dispersion forces, which become stronger as the distance between adsorbates and pore walls decrease. Consequently, for an AC to be effective in physically adsorbing an impurity or pollutant, the AC should possess a substantial volume of pores sized appropriately to adsorb the impurity. Generally, a pore should be 1.5 to 3 times larger than the size of the impurity to adsorb. Smaller pores may not allow for adsorption and larger pores may not be able to retain, or "grip," the impurity. An AC's level of microporosity and mesoporosity has a significant impact on its adsorption performance with respect to small sized impurities. Without phosphoric acid treatment prior to activation, certain ACs may have limited microporosity. For example, lignite-based AC typically has a pore volume of approximately 0.1 mL/g for pores with diameters less than 2 nanometers. Bituminous coal-based AC typically has approximately three times this pore volume, i.e., 0.3 mL/g, in the same diameter range. Wood- and peat-based AC typically have pore volumes of 0.3 mL/g or more for pores with diameters less than 2 nanometers. The ability to increase the volume of this pore size range for ACs is valuable, because this pore size range has a proven importance in adsorption performance in certain markets, including, for example in the treatment and purification of water, in the purification, production or treatment of chemicals, pharmaceuticals, alcohol, and food products, such as sugar, for odor control, as a carrier of other catalysts, and/or in the purification of air or gas streams, e.g., for the removal of an impurity, such as mercury, from a flue gas stream. For certain raw materials, it may also be valuable to maintain microporosity during activation and improve other properties of the resulting AC, such as the activation yield.

Treating a raw material with phosphoric acid prior to activation may be one way to achieve these changes. Phosphoric acid may affect the activation process through multiple pathways. In certain embodiments, phosphoric acid applied to a raw material prior to activation may serve to reduce catalysis of the steam-carbon reaction. In this way the phosphoric acid slows the activation process and allows the development of increased macro- and/or mesoporosity with respect to macroporosity. Phosphoric acid may also catalyze bond cleavage reactions and crosslink formation (through cyclization, condensation, etc.). This reaction, combined with the ability of phosphoric acid to react directly with organics present in the raw material, may allow for the formation of phosphate and polyphosphate bridges that connect crosslinked pore structure fragments, and thus, allow for the restructuring of porosity both before and after activation. Nuclear magnetic resonance ("NMR") studies of certain phosphoric acid treated ACs suggest that the majority of the phosphate structures formed are directly bound to the carbon lattice via carbon bonds, or Carbon-Oxygen-Phosphorous ("C—O—P") bonding. Many of the C—O—P bonds may be non-reactive and integral to the carbon lattice. Changes related to phosphoric acid treatment of a raw material, e.g., the slowing of the activation process, crosslink formation, and/or a change in the rate of oxidation of volatiles and coal tar pitch, may result in the ability to direct-activate the raw material without agglomeration or grinding and reagglomeration prior to activation.

Evaluating an AC with and without phosphoric acid treatment prior to activation allows for an indication of the impact of the treatment on microporosity and/or mesoporosity. Iodine Number may be used as an indication of microporosity and Bromophenol Blue ("BPB") Number may be used as an indication of mesoporosity. Iodine Number may be determined in accordance with ASTM Standard D4607 or similar procedures. BPB Number may be determined by calculating the amount of BPB adsorbed per unit of a sorbent at 90% removal of BPB in accordance with the procedure generally explained here: A fixed concentration of BPB in a buffered aqueous solution is contacted with powdered sorbent at room temperature. The sorbent is removed from the solution by filtration and the residual BPB concentration is determined using spectrographic analysis. The residual concentration is used to calculate the amount of BPB adsorbed per gram of sorbent at 90% removal of BPB from the original solution. The BPB Number may be calculated by multiplying the test volume of BPB Solution (L) and the 90% BPB concentration removed (mg/L) and dividing by the weight (g) of the powdered sorbent sample.

The micro- and mesoporosity is known or may be determined for many of the raw materials suitable for treatment in accordance with various embodiments. For example, lignite-based AC prepared without a phosphoric acid treatment may have certain microporosity and mesoporosity characteristics, for example, untreated lignite-based AC may exhibit an Iodine Number generally ranging from 400 to 650 and a BPB Number ranging from 70 to 140. In certain embodiments, phosphoric acid treated lignite-based AC, depending on the activation conditions and amount of phosphoric acid applied to the lignite, demonstrates an increase in Iodine Number and/or BPB Number in comparison to untreated lignite-based AC. For example, Iodine Number may range from 670 to 800 and BPB Number may range from 140 to 250. When a phosphoric acid treated lignite-based AC is washed with hydrochloric acid in accordance with various embodiments, Iodine Number and/or BPB Number may increase again. For example, Iodine Number may range from 900 to 1220 and BPB Number may range from 200 to 500. Increases in mesoporosity and macroporosity may be valuable in markets where microporosity, mesoporosity or both are critical to performance, for example, in the treatment and purification of water, in the production of chemicals, pharmaceuticals, alcohol, and food products, such as sugar, in the purification of air and/or gas streams, as a carrier for catalysts, and/or for odor removal. Additionally, in certain embodiments, phosphoric acid treated lignite-based AC may also be able to retain the characteristically high macroporosity of untreated lignite-based AC, as measured by Molasses Relative Efficiency ("Molasses RE"). Molasses RE may be calculated by determining the relative efficiency for decolorization purposes of a test sorbent, and is expressed as 100 times the ratio of the color removed per unit weight by the test sorbent to the color removed per unit weight by a standard activated carbon, at 90% decolorization of a blackstrap molasses solution, measured by decolorization of standard solutions with different amounts by weight of activated carbon.

Figure 1B:
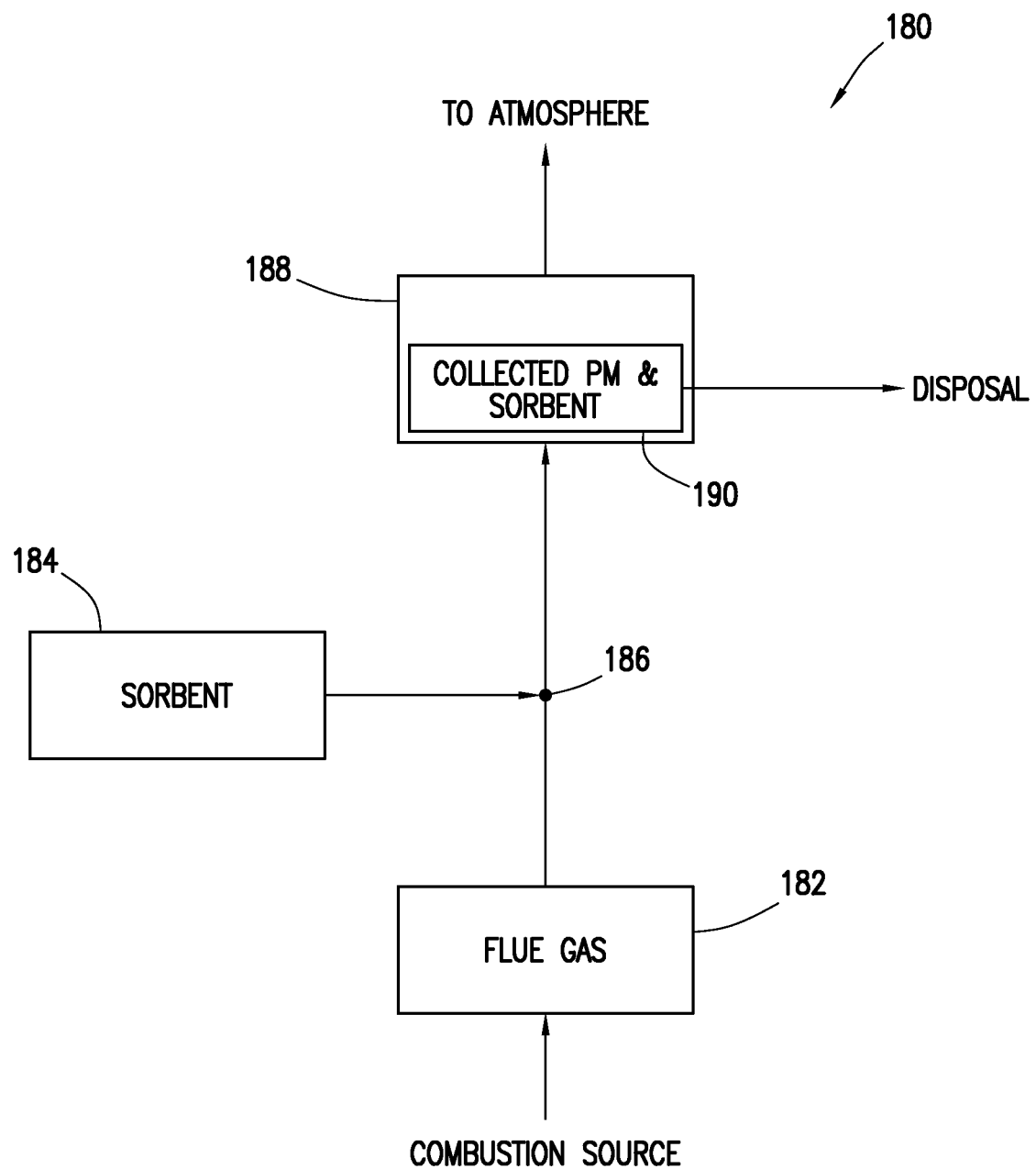

FIGS. 1A and 1B illustrate systems related to a sorbent treated with a phosphoric acid treatment in accordance with particular embodiments. FIG. 1A illustrates a system for the application of phosphoric acid in accordance with particular embodiments. System 100 comprises components for the production of phosphoric acid treated ("PAT") activated carbon from a raw material. Raw materials that may treated in system 100 include, without limitation, peat, wood, lignocellulosic materials, biomass, waste, tire, corn hulls, rice hulls, petroleum coke, various coals, such as lignite, brown coal, anthracite coal, bituminous coal, and sub-bituminous coal, various nut-shells, such as pecan shells and walnut shells, and materials from various drupes, such as coconut shells, olive pits, and peach pits. Raw materials may vary in composition. For example, lignite is available with a range of ash contents.

In certain embodiments, the desired raw material particle size distribution may vary depending on the raw material used in system 100. System 100 may be used to create PAT ACs from raw materials of a variety of particle sizes. For example, particles suitable for treatment with phosphoric acid in system 100 may have a diameter ranging from less than or equal to 1 micron to 5 inches on a weight basis, and in particular, from 1 micron to 400 mesh, from 400 mesh to 100 mesh, from 100 mesh to 30 mesh, from 30 mesh to 18 mesh, from 18 mesh to 16 mesh, from 16 mesh to 12 mesh, from 12 mesh to 8 mesh, from 8 mesh to 6 mesh, from 6 mesh to 4 mesh, from 4 mesh to 3.5 mesh, from 3.5 mesh to 0.5 inches, from 0.5 inches to 0.75 inches, from 0.75 inches to 1.0 inches, from 1.0 inches to 1.5 inches, from 1.5 inches to 3 inches, and/or from 3 inches to 5 inches. The average particle size and particle size distribution, based on particles having one or more of the sizes listed above, may be adjusted using techniques known to those of skill in the art to achieve a desired average size and distribution. For example, a raw material may be ground and/or classified (i.e., sorted and selected based on size) to achieve a desired average particle size and particle size distribution.

FIG. 1A illustrates the use of system 100 to create a PAT AC through the production of PAT lignite-based AC 150 from lignite 102. While the description below refers to lignite 102, the processes laid out in connection with FIG. 1A and elsewhere herein, including the various operational parameters, are equally applicable to the other raw materials discussed herein. Lignite 102 travels along step belt 112 and enters lower feed bin 114. From lower feed bin 114, lignite 102 travels along incline belt 116 and enters upper feed bin 118. After leaving lower feed bin 114, lignite 102 travels toward kiln 130. Lignite 102 may travel through the components of system 100 at any suitable rate. In various embodiments, the initial feed rate of lignite 102 may be approximately 2000 to 20000 pounds per hour, for example, from 2000 to 4000, from 4000 to 6000, from 6000 to 8000, from 8000 to 10000, from 10000 to 12000, from 12000 to 14000, from 14000 to 16000, from 16000 to 18000, or from 18000 to 20000 pounds per hour depending on the size of the kiln and the composition of the raw material. In certain embodiments, density measurements, such as 6×20 Vibrating Feed Density, may be a useful guiding process control. Density may be evaluated in accordance with ASTM Standard D2854 or similar procedures.

Before reaching kiln 130 for activation, lignite 102 is treated with solution 120, which is an aqueous solution of 85% phosphoric acid by weight. The concentration of phosphoric acid in the solution may be any concentration suitable to support an improvement in the treated lignite, e.g., an increase in activation yield, an increase in micro- and/or mesoporosity, and/or obviating reagglomeration processes. In certain embodiments, the concentration of phosphoric acid may range from 10% to 100% by weight, for example, from 10% to 15%, from 15% to 20%, from 20% to 25%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, from 80% to 85%, from 85% to 90%, from 90% to 95%, or from 95% to 100%. In some embodiments, lignite 102 may be treated with a solution of phosphoric acid at least 50% by weight, at least 55% by weight, at least 60% by weight, at least 65% by weight, at least 70% by weight, at least 75% by weight, at least 80% by weight, at least 85% by weight, at least 90% by weight, or at least 95% by weight.

Solution 120 may be applied with a sprayer, atomizer, or any suitable applicator that allows solution 120 to be sprayed or deposited on lignite 102 at a relatively constant rate. Alternatively, solution 120 may be dripped onto lignite 102. In particular embodiments, solution 120 may be sprayed so as to provide a relatively low dose of phosphoric acid to lignite 102, for example, at a dosing rate of approximately 10%, i.e., at a rate sufficient to achieve a ratio of approximately 0.1 pounds of solution 120 per pound of lignite 102. An adjusted dosing rate of solution 120 may be employed to achieve desired absorption properties in the PAT lignite-based AC 150. For example, in various embodiments the dosing rate may range from 1% to 30% (i.e. from 0.01 pounds to 0.3 pounds of solution 120 per pound of lignite 102), for example, from 1% to 1.5%, from 1.5% to 2%, from 2% to 2.5%. from 2.5% to 3%, from 3% to 3.5%, from 3.5% to 4%, from 4.5% to 5%, from 5% to 5.5%, from 5.5% to 6%, from 6% to 6.5%, from 6.5% to 7%, from 7% to 7.5%, from 7.5% to 8%, from 8% to 8.5%, from 8.5% to 9%, from 9% to 9.5%, from 9.5% to 10%, from 10% to 11%, from 11% to 12%, from 12% to 13%, from 13% to 14%, from 14% to 15%, from 15% to 16%, from 16% to 17%, from 17% to 18%, from 18% to 19%, from 19% to 20%, from 20% to 21%, from 21% to 22%, from 22% to 23%, from 23% to 24%, from 24% to 25%, from 25% to 26%, from 26% to 27%, from 27% to 28%, from 28% to 29%, or from 29% to 30%. In particular embodiments, the dosing rate may be at least 1%, at least 5%, at least 10%, at least 15%, at least 20%, or at least 25% by weight.

In various embodiments, the sprayer or other applicator may be oriented in a manner to direct the solution primarily toward lignite 102, so as to ensure contact between solution 120 and lignite 102 and to reduce unnecessary contact between solution 120 and components of system 100. In certain embodiments, the applicator may spread the solution on lignite 102. Solution 120 should be applied to the lignite as uniformly and evenly as practically possible in order to avoid some portions of lignite 102 being overdosed with solution 120 and/or other portions receiving no contact at all. As solution 120 is applied to lignite 102, moderate blending of lignite 102 may increase the uniformity with which the phosphoric acid comes into contact with lignite 102. For example, in certain embodiments, blending of the lignite 102 may be facilitated by a screw conveyor.

After lignite 102 is treated with solution 120, it enters kiln 130. Activation occurs through selective oxidation of the lignite with steam such that it develops additional internal porosity. The time between treatment with solution 120 and entering the kiln may not impact the Iodine Number of lignite 102. In testing of lignite as a raw material, times ranging between 0 and 120 minutes were tried between the treatment of lignite 102 with solution 120 and the time lignite 102 enters kiln 130 without impact.

In certain embodiments, during the time between treatment with solution 120 and entering kiln 130, lignite 102 may be dried. Lignite 102 may exhibit increased adhesive and/or cohesive properties following treatment with solution 120 that may make it more difficult to move the lignite into the kiln. Thus, in various embodiments, compressed air may be added to facilitate drying and/or to aid conveyance of the treated lignite into kiln 130. A modified screw conveyor or modified paddle conveyor may also aid conveyance of the lignite or other raw materials into kiln 130. Lignite 102, following treatment with solution 120, is suitable for direct-activation; that is, lignite 102 does not need to be ground to a powder (either before or after treatment with solution 120) and reagglomerated into pellets prior to activation.

Lignite 102, treated with solution 120, enters kiln 130 for activation by a steam treatment. Once lignite 120 enters kiln 130 it is heated, without steam, up to approximately 650° C. to 700° C., causing the volatilization of various volatile hydrocarbons, e.g., methane, butane, etc., from lignite 102. These gases may form a inert gas layer that serves to protect the lignite and prevent it from combusting. This is often referred to as carbonization or charring. Air may then be introduced into kiln 130 to combust the volatile hydrocarbons, and to generate heat in the kiln. In particular embodiments, inert gases, such as nitrogen or argon, may be introduced into the kiln to facilitate charring.

Low pressure steam 128 is introduced into the kiln in the primary activation stage. In various embodiments, compressed air 124, often known as process air, is introduced as well. Kiln burner 132 combusts fuel, typically natural gas 136, to fire kiln 130. Kiln 130 may be fired to any suitable temperature sufficient to achieve activation. In certain embodiments, kiln temperatures may range from 600° C. to 1050° C., and in particular, from 600° C. to 650° C., from 650° C. to 700° C., from 700° C. to 750° C., from 750° C. to 800° C., from 800° C. to 850° C., from 850° C. to 900° C., from 900° C. to 950° C., from 950° C. to 1000° C., or from 1000° C. to 1050° C. In particular embodiments, the kiln temperature may be at least 600° C. Kiln activation temperatures may be generally 100° C. to 300° C. higher than required for activation of untreated lignite. Lignite 102 may remain in kiln 130 for any suitable time sufficient to achieve activation. In certain embodiments, lignite 102 may be activated to any suitable density as measured by Vibrating Feed Density. In various embodiments, the residence time of lignite 102 in kiln 130, or the time it remains in kiln 130, may vary, ranging from an hour or less, for example between approximately 30 to 60 minutes, to more than an hour, for example between approximately 4 to 24 hours, for example, from 4 to 6 hours, from 6 to 8 hours, from 8 to 10 hours, from 10 to 12 hours from 12 to 14 hours, from 14 to 16 hours, from 16 to 18 hours, from 18 to 20 hours, from 20 to 22 hours, or from 22 to 24 hours. In certain embodiments, activation occurring during the steam treatment is where the majority of AC porosity develops. The factors that determine the amount of porosity developed in lignite-based AC treated with phosphoric acid (assuming that at least some amount of steam is introduced) include the kiln temperature and time duration of this activation stage. In various embodiments, the optimal temperature and activation time may vary moderately according to the composition, density, and level of organization of the carbon of the raw material being activated. Additionally, in certain embodiments, gas activation may occur using carbon dioxide or an inert gas, such as nitrogen or argon, instead of steam. The residence time may vary depending on the particle size of the raw material; this, along with the operating parameters of the conveying systems into and within kiln 130, may be varied by the skilled artisan to change the residence time to achieve a desired extent of activation. The porosity, as measured, for example, by the Molasses RE and Iodine Number, may be varied by adjusting the operating parameters of the kiln to achieve a particular Vibrating Feed Density in the resulting activated carbon product. In general, higher porosity materials will have a lower density. Kiln 130 may be a horizontal kiln in various embodiments and may be a multihearth furnace in some embodiments.

Exhaust gases generated during activation exit kiln 130 through kiln hood 140. Fly ash hopper 142 removes fly ash and exhaust gases are vented to a boiler.

Following activation, PAT lignite-based AC 150 exits kiln 130. In the embodiment shown in FIG. 1A, PAT lignite-based AC is then washed with hydrochloric acid solution 160. A hydrochloric acid wash is not a necessary step, and may be omitted in accordance with various embodiments. Washing with hydrochloric acid 160 may include a traditional, plant scale acid-washing process or, in certain embodiments, may include a spray application similar to the phosphoric acid application described previously. In various embodiments, solution 160 may include hydrochloric acid at a range of concentrations, for example, from 1% to 12% hydrochloric acid by weight, for example from 1% to 2%, from 2% to 3%, from 3% to 4%, from 4% to 5%, from 5% to 6%, from 6% to 7%, from 7% to 8%, from 8% to 9%, from 9% to 10%, from 10% to 11%, or from 11% to 12%. In particular embodiment, solution 160 may include at least 1% hydrochloric acid by weight, at least 5% hydrochloric acid by weight, at least 7% hydrochloric acid by weight, or at least 10% hydrochloric acid by weight. Alternatively or in addition, solution 160 may include other washing agents, including without limitation sodium hydroxide.

Washing the PAT lignite-based AC 150 with hydrochloric acid solution 160 may increase its microporosity. Increases in microporosity may be demonstrated by an increase in Iodine Number or Butane Number. Butane Number may be determined in accordance with ASTM Standard D5742 or similar procedures.

Improvements in one or more of these measurements may be significant enough to indicate that the hydrochloric acid washed activated PAT raw material is suitable for applications requiring high microporosity. In particular, this is an area from which lignite-based AC has traditionally been excluded. Once washing with hydrochloric acid solution 160 is complete, the process is complete and results in a finished product of PAT, hydrochloric acid washed lignite-based AC 170.

As stated previously, system 100 may be used to create PAT ACs from a variety of raw materials. For example, system 100 may be used to treat peat with phosphoric acid prior to activation. In various embodiments, peat may be treated with an aqueous solution of phosphoric acid, with a concentration of phosphoric acid ranging from 10% to 100% by weight, for example, from 10% to 15%, from 15% to 20%, from 20% to 25%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, from 80% to 85%, from 85% to 90%, from 90% to 95%, or from 95% to 100%. In some embodiments, peat may be treated with a solution of phosphoric acid at least 50% by weight, at least 55% by weight, at least 60% by weight, at least 65% by weight, at least 70% by weight, at least 75% by weight, at least 80% by weight, at least 85% by weight, at least 90% by weight, or at least 95% by weight. Further, in certain embodiments, the dosing rates may range from 1% to 30% (i.e. from 0.01 pounds to 0.3 pounds of solution 120 per pound of lignite 102), for example, from 1% to 1.5%, from 1.5% to 2%, from 2% to 2.5%. from 2.5% to 3%, from 3% to 3.5%, from 3.5% to 4%, from 4.5% to 5%, from 5% to 5.5%, from 5.5% to 6%, from 6% to 6.5%, from 6.5% to 7%, from 7% to 7.5%, from 7.5% to 8%, from 8% to 8.5%, from 8.5% to 9%, from 9% to 9.5%, from 9.5% to 10%, from 10% to 11%, from 11% to 12%, from 12% to 13%, from 13% to 14%, from 14% to 15%, from 15% to 16%, from 16% to 17%, from 17% to 18%, from 18% to 19%, from 19% to 20%, from 20% to 21%, from 21% to 22%, from 22% to 23%, from 23% to 24%, from 24% to 25%, from 25% to 26%, from 26% to 27%, from 27% to 28%, from 28% to 29%, or from 29% to 30%. In particular embodiments, the dosing rate may be at least 1%, at least 5%, at least 10%, at least 15%, at least 20%, or at least 25% by weight. In system 100, peat is sprayed with a solution of 75% phosphoric acid at a dosing rate of 5% prior to activation. Peat is then activated by exposure to steam in kiln 130 at an activation temperature that generally ranges from 600° C. to 1050° C., and in particular, from 600° C. to 650° C., from 650° C. to 700° C., from 700° C. to 750° C., from 750° C. to 800° C., from 800° C. to 850° C., from 850° C. to 900° C., from 900° C. to 950° C., from 950° C. to 1000° C., or from 1000° C. to 1050° C. Retention time in kiln 130 may range from an hour or less, for example between approximately 30 to 60 minutes, to more than an hour, for example between approximately 4 to 24 hours, for example, from 4 to 6 hours, from 6 to 8 hours, from 8 to 10 hours, from 10 to 12 hours from 12 to 14 hours, from 14 to 16 hours, from 16 to 18 hours, from 18 to 20 hours, from 20 to 22 hours, or from 22 to 24 hours. After exiting kiln 130, the resulting activated carbon may be optionally washed with hydrochloric acid solution 160, which may further increase microporosity. Following activation in system 100, PAT peat-based AC may exhibit increases in microporosity and mesoporosity, and activation yield increases of up to 20% in comparison to untreated peat-based AC, which may result in economic and environmental benefits. Furthermore, the phosphoric acid treatment may eliminate the need to grind the peat to a powder and reagglomerate it into pellets prior to activation. Rather, the peat may be used as received from the supplier or optionally classified to provide a desired particle size distribution prior to phosphoric acid treatment and activation.

As another example, system 100 may be used to treat wood-chips with phosphoric acid prior to activation. In various embodiments, wood-chips may be treated with an aqueous solution of phosphoric acid, with a concentration of phosphoric acid ranging from 10% to 100% by weight, for example, from 10% to 15%, from 15% to 20%, from 20% to 25%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, from 80% to 85%, from 85% to 90%, from 90% to 95%, or from 95% to 100%. In some embodiments, wood-chips may be treated with a solution of phosphoric acid at least 50% by weight, at least 55% by weight, at least 60% by weight, at least 65% by weight, at least 70% by weight, at least 75% by weight, at least 80% by weight, at least 85% by weight, at least 90% by weight, or at least 95% by weight. Further, in certain embodiments, the dosing rates may range from 1% to 30% (i.e. from 0.01 pounds to 0.3 pounds of solution 120 per pound of lignite 102), for example, from 1% to 1.5%, from 1.5% to 2%, from 2% to 2.5%. from 2.5% to 3%, from 3% to 3.5%, from 3.5% to 4%, from 4.5% to 5%, from 5% to 5.5%, from 5.5% to 6%, from 6% to 6.5%, from 6.5% to 7%, from 7% to 7.5%, from 7.5% to 8%, from 8% to 8.5%, from 8.5% to 9%, from 9% to 9.5%, from 9.5% to 10%, from 10% to 11%, from 11% to 12%, from 12% to 13%, from 13% to 14%, from 14% to 15%, from 15% to 16%, from 16% to 17%, from 17% to 18%, from 18% to 19%, from 19% to 20%, from 20% to 21%, from 21% to 22%, from 22% to 23%, from 23% to 24%, from 24% to 25%, from 25% to 26%, from 26% to 27%, from 27% to 28%, from 28% to 29%, or from 29% to 30%. In particular embodiments, the dosing rate may be at least 1%, at least 5%, at least 10%, at least 15%, at least 20%, or at least 25% by weight. In system 100, the wood chips are sprayed with a solution of 75% phosphoric acid at a dosing rate of 5% prior to activation. The wood chips are then activated by exposure to steam in kiln 130 at an activation temperature that generally ranges from 600° C. to 1050° C., and in particular, from 600° C. to 650° C., from 650° C. to 700° C., from 700° C. to 750° C., from 750° C. to 800° C., from 800° C. to 850° C., from 850° C. to 900° C., from 900° C. to 950° C., from 950° C. to 1000° C., or from 1000° C. to 1050° C. Retention time in kiln 130 may range from an hour or less, for example between approximately 30 to 60 minutes, to more than an hour, for example between approximately 4 to 24 hours, for example, from 4 to 6 hours, from 6 to 8 hours, from 8 to 10 hours, from 10 to 12 hours from 12 to 14 hours, from 14 to 16 hours, from 16 to 18 hours, from 18 to 20 hours, from 20 to 22 hours, or from 22 to 24 hours. After exiting kiln 130, the resulting activated carbon may be optionally washed with hydrochloric acid solution 160, which may further increase microporosity. Following activation in system 100, PAT wood chip-based AC may exhibit increases in microporosity and activation yield increases of up to 20% in comparison to untreated wood chip-based AC, which may result in economic and environmental benefits. Furthermore, the phosphoric acid treatment may eliminate the need to grind the wood chips to a powder and reagglomerate them into pellets prior to activation. Rather, the wood chips may be used as received from the supplier or optionally classified to provide a desired particle size distribution prior to phosphoric acid treatment and activation.

As another example, system 100 may be used to treat waste tire with phosphoric acid prior to activation. In various embodiments, tire may be treated with an aqueous solution of phosphoric acid, with a concentration of phosphoric acid ranging from 10% to 100% by weight, for example, from 10% to 15%, from 15% to 20%, from 20% to 25%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, from 80% to 85%, from 85% to 90%, from 90% to 95%, or from 95% to 100%. In some embodiments, tire may be treated with a solution of phosphoric acid at least 50% by weight, at least 55% by weight, at least 60% by weight, at least 65% by weight, at least 70% by weight, at least 75% by weight, at least 80% by weight, at least 85% by weight, at least 90% by weight, or at least 95% by weight. Further, in certain embodiments, the dosing rates may range from 1% to 30% (i.e. from 0.01 pounds to 0.3 pounds of solution 120 per pound of lignite 102), for example, from 1% to 1.5%, from 1.5% to 2%, from 2% to 2.5%. from 2.5% to 3%, from 3% to 3.5%, from 3.5% to 4%, from 4.5% to 5%, from 5% to 5.5%, from 5.5% to 6%, from 6% to 6.5%, from 6.5% to 7%, from 7% to 7.5%, from 7.5% to 8%, from 8% to 8.5%, from 8.5% to 9%, from 9% to 9.5%, from 9.5% to 10%, from 10% to 11%, from 11% to 12%, from 12% to 13%, from 13% to 14%, from 14% to 15%, from 15% to 16%, from 16% to 17%, from 17% to 18%, from 18% to 19%, from 19% to 20%, from 20% to 21%, from 21% to 22%, from 22% to 23%, from 23% to 24%, from 24% to 25%, from 25% to 26%, from 26% to 27%, from 27% to 28%, from 28% to 29%, or from 29% to 30%. In particular embodiments, the dosing rate may be at least 1%, at least 5%, at least 10%, at least 15%, at least 20%, or at least 25% by weight. In system 100, tire is sprayed with a solution of 75% phosphoric acid at a dosing rate of 5% prior to activation. The tire is then activated in kiln 130 at an activation temperature that generally ranges from 600° C. to 650° C., from 650° C. to 700° C., from 700° C. to 750° C., from 750° C. to 800° C., from 800° C. to 850° C., from 850° C. to 900° C., from 900° C. to 950° C., from 950° C. to 1000° C., or from 1000° C. to 1050° C. Retention time in kiln 130 may range from an hour or less, for example between approximately 30 to 60 minutes, to more than an hour, for example between approximately 4 to 24 hours, for example, from 4 to 6 hours, from 6 to 8 hours, from 8 to 10 hours, from 10 to 12 hours from 12 to 14 hours, from 14 to 16 hours, from 16 to 18 hours, from 18 to 20 hours, from 20 to 22 hours, or from 22 to 24 hours. After exiting kiln 130, the resulting activated carbon may be optionally washed with hydrochloric acid solution 160, which may further increase microporosity. Following activation in system 100, PAT tire-based AC may exhibit increases in microporosity and mesoporosity, and activation yield increases of up to 20% in comparison to untreated tire-based AC, which may result in economic and environmental benefits. Other raw materials may be treated with phosphoric acid prior to activation to achieve similar or other improvements. Furthermore, the phosphoric acid treatment may eliminate the need to grind the waste tire to a powder and reagglomerate it into pellets prior to activation. While the waste tire material is derived from tires that have been cut into smaller pieces, such pieces may be used as received from the supplier or optionally classified to provide a desired particle size distribution prior to phosphoric acid treatment and activation.

Further, in particular embodiments, the activation time and temperature may vary depending on the raw material used in system 100. As discussed herein, the activation temperature for an AC treated with phosphoric acid ranges approximately from 600° C. to 1050° C. Activation temperatures for PAT ACs may generally be approximately 100° C. to 300° C. higher than is required for activation of untreated ACs. Retention time in kiln 130 for PAT ACs ranges from 30 minutes to 24 hours.

In particular embodiments, system 100 may utilize regulators, pressure valves, valves, heating elements, process controls, and other components as appropriate. System 100 may be configured in any suitable or necessary way to treat a raw material with phosphoric acid. For example, various embodiments may employ a batch treatment process. Certain embodiments may include additional or different components, or may exclude or alter certain components or functionalities. For example, some embodiments need not include a hydrochloric acid wash.

Technical advantages of using system 100 or similar processes to produce PAT AC may include an increase in microporosity and/or mesoporosity. In certain embodiments, microporosity of a PAT AC may be assessed by Iodine Number. An increase in Iodine Number may indicate improved microporosity. Mesoporosity may be assessed by BPB Number. An increase in BPB Number may indicate improved mesoporosity. A decrease in water soluble content, a measure of purity in water applications, may be an additional advantage in some embodiments. Water solubles may be evaluated in accordance with ASTM Standard D5029 or similar procedures. Treating a raw material with phosphoric acid prior to activation may also improve the activation yield of the material. Technical advantages of using system 100 to treat a raw material prior to activation with phosphoric acid may alternatively or additionally include the ability to direct-activate raw materials that may otherwise require agglomeration or grinding and reagglomeration prior to activation. Certain embodiments of PAT AC may exhibit one, more than one, or all of these advantages. Various embodiments may exhibit additional or different advantages.

An additional advantage may include a reduction or elimination of facility corrosion or damage in various embodiments that utilize a spray application to apply the phosphoric acid solution. In particular, using a low dose, i.e., a low acid to carbon ratio and in particular, approximately equal to or less than a 30% by weight application of solution containing phosphoric acid, as described herein, may prevent severe corrosion to manufacturing infrastructure that would necessitate the continuous repair and replacement commonly associated with a high dose chemical activation of wood. This low dose application of a phosphoric acid solution may additionally or alternatively reduce exposure to facility personnel. Using a spray applicator to apply the phosphoric acid solution may also reduce the time necessary for cleaning or other decontamination processes before a kiln or other system components may be used for a non-PAT process. In particular embodiments, applying low doses of phosphoric acid solution may also provide economic benefits by avoiding costs associated with higher doses of phosphoric acid. Economic benefits may also arise from the ability to use a low cost raw material like lignite and still achieve desired absorption performance as will be discussed in conjunction with the data provided in FIGS. 2 through 10. Additional economic benefits may arise from the ability to improve the activation yield of a raw material like walnut shells without sacrificing microporosity as will be discussed in conjunction with the data provided in FIGS. 11A, 11B, and 11C.

FIG. 1B illustrates a system for the injection of a sorbent treated with phosphoric acid into a flue gas stream. System 180 provides a simplistic overview of a treatment process for flue gases.

Flue gas 182 results from the combustion of a raw material such as coal. Due to air quality and emissions regulations, utility plants that burn coal must often treat any flue gas to ensure it contains only certain levels of regulated compounds, such as nitrogen oxides ($NO_x$), sulfur oxides ($SO_x$), and particulate matter ("PM"), and heavy metals, such as mercury. In this embodiment, flue gas 182 contains at least mercury at a level requiring emission control.

Sorbent 184 is prepared in a process similar to the process described in conjunction with FIG. 1A. Specifically, sorbent 184 is sprayed with a solution of 85% phosphoric acid, is then activated via a steam treatment, and, following activation, is washed with hydrochloric acid. Sorbent 184 is injected into the steam of flue gas 182 at an injection point 186. Upon injection, sorbent 184 adsorbs mercury contained in flue gas 182. In various treatment processes, there may be an air preheater, which heats the flue gas stream. The sorbent injection point may be upstream, i.e., on the cold side, or downstream, i.e., on the hot side, of the air preheater, or in certain treatment process, there may be multiple injection points.

Downstream of injection point 186, flue gas 182 encounters particulate collection device 188. Particulate collection device 188 filters out particulate matter from flue gas 182. Particulate collection device 188 also collects sorbent 184. Particulate collection device 188 may be any collection device suitable to collect particulate matter and/or spent sorbents, i.e., sorbents laden with impurities or pollutants adsorbed from the flue gas stream, including, for example, an electrostatic precipitator or a fabric filter (i.e., baghouse) application or other the devices listed by the United States Environmental Protection Agency in its module on "Air Pollutants and Control Techniques." *See Module 6: Air Pollutants and Control Techniques—Particulate Matter—Characteristics*, U.S. Environmental Protection Agency, http://www.epa.gov/apti/bces/module6/matter/control/control.htm (last visited Jan. 11, 2013). Flue gas 182, once scrubbed by particulate collection device 188, is vented to the atmosphere. In certain treatment processes, this venting may occur through a stack.

Particulate collection device 188 is constructed such that collected particulate matter, often in the form of fly ash, and spent sorbent, illustrated as collected PM and sorbent 190, may be removed for disposal. Removing sorbent 184 from particulate collection device 188 effectively removes sorbent 184 and any absorbed impurities from flue gas stream 182.

In various embodiments, sorbent 184 may be an AC created from a variety of raw materials including peat, wood, lignocellulosic materials, biomass, waste tire, corn hulls, rice hulls, petroleum coke, various coals, such as, lignite, brown coal, anthracite coal, bituminous coal, and sub-bituminous coal, various nut-shells, such as pecan shells and walnut shells, and materials from various drupes, such as coconut shells, olive pits, and peach pits.

As one skilled in the art will understand, ACs prepared in a manner similar to the process described in FIG. 1A, i.e., from raw material treated with phosphoric acid at a relatively low dosing rate prior to activation, may develop a greater amount of microporosity and mesoporosity than raw material that is not treated with phosphoric acid. As a result, treated ACs may be appropriate for other applications in addition to the system for removing mercury from flue gas described here. For example, other applications that require the removal of small molecular weight impurities include the removal of trihalomethanes and/or chloramines in potable water, or the removal trace impurities in the preparation of fine chemicals or pharmaceuticals. Using a AC treated with phosphoric acid prior to activation may produce improved removal rates when compared to other untreated ACs and/or may provide improved economic indicators given the low cost associated with certain raw materials, such as lignite, and the reduced cost associated with a low dosing rate of phosphoric acid. These additional applications may use a PAT AC in any suitable form, for example, the AC may be in a powdered form or a granular form.

Figures 2A, 2B:
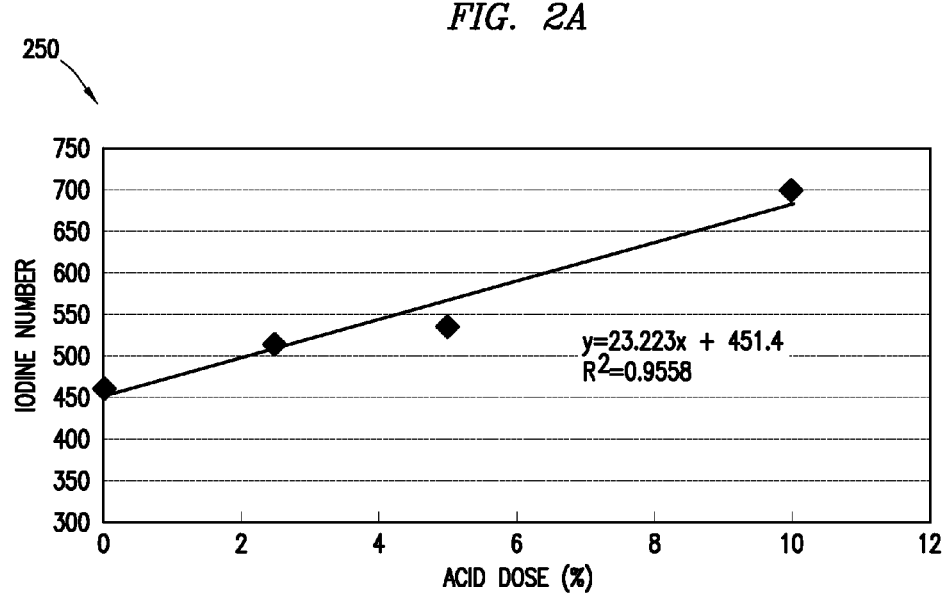
FIGS. 2A and 2B illustrate the relationship between phosphoric acid treatment and Iodine Number in accordance with particular embodiments.

FIGS. 2A and 2B illustrate the relationship between phosphoric acid treatment and Iodine Number in accordance with particular embodiments. FIG. 2A includes Table 200 and FIG. 2B includes Graph 250. Table 200 provides data corresponding to a series of lignite-based AC samples activated in a batch activation process for 60 minutes at the same activation temperature.

Columns 202 through 208 provide data on Samples 2-1 through 2-4, respectively. Sample 2-1 is an untreated lignite-based AC that was activated in a batch process. Samples 2-2, 2-3, and 2-4 are lignite-based AC samples that were treated with phosphoric acid in a batch treatment process, in which, similar to the process described in conjunction with FIG. 1A, a solution comprising phosphoric acid was sprayed onto the samples prior to activation by exposure to steam.

Row 210 provides the phosphoric acid dose applied to each treated sample: 2.5% by weight for Sample 2-2, 5.0% for Sample 2-3, and 10.0% for Sample 2-4, where the weight percentage indicates the ratio of the aqueous solution containing the phosphoric acid with respect to the raw material, not the proportion of the phosphoric acid in the solution. Row 212 provides the activation yield, which increases with phosphoric acid dose. Row 214 provides water solubles for each sample and shows a significant reduction in water solubles for Samples 2-2 through 2-4. In various embodiments, the decrease in water solubles may occur because the phosphoric acid reacts with the mineral ash constituents in the lignite to form phosphates (primarily calcium, sodium, and potassium phosphates) that are sparingly soluble. This may mean that a lesser amount of water soluble compounds may wash off the treated AC in water based applications, potentially reducing scaling and purity issues in certain applications.

Row 216 provides the final percentage of ash by weight for each Sample. All three PAT Samples demonstrate a slight reduction in final ash, although this effect is not linearly correlated to phosphoric acid dose. In various embodiments, this effect may be caused by the phosphoric acid reducing the activation reaction rate and reducing the carbon burn-off rate, in addition to the development of macroporosity. If less carbon is burned and blown out as fine particles by the development of macrospores, ash may be a smaller percentage of the final remaining mass. Additionally, ash reduction may not have been observed for phosphoric acid doses greater than 2.5%, because the development of macroporosity may not be further significantly slowed, as evidenced by the plateau in Molasses RE.

Row 218 provides Molasses RE and Row 220 provides BPB Numbers, which both drop considerably for Samples 2-2, 2-3, and 2-4 in comparison to Sample 2-1. The increase in activation yield, and simultaneous decrease in Molasses RE, may indicate that PAT lignite-based AC needs additional activation in order to develop further mesoporosity and macroporosity.

Row 222 provides Iodine Number, which appears to correlate strongly with the increase in phosphoric acid dose. Under these activation conditions, the most significant improvement in Iodine Number occurs with the 10% phosphoric acid dose. Graph 250 illustrates the generally linear relationship between phosphoric acid dose and Iodine Number: as phosphoric acid dose increases so does Iodine Number.

FIGS. 3A, 3B, and 3C also illustrate the relationship between phosphoric acid treatment and Iodine Number in accordance with particular embodiments. FIG. 3A includes Table 300, FIG. 3B includes Table 340, and FIG. 3C includes Table 370, which collectively provide data corresponding to a series of lignite-based AC samples activated in a batch activation process at an activation temperature approximately 100° C. to 300° C. higher than the samples described in FIGS. 2A and 2B.

Table 300 provides data for samples activated for 30 minutes. Columns 302 through 312 provide data on Samples 3-1 through 3-6, respectively. Row 314 provides the phosphoric acid treatment dose for each Sample. Sample 3-1 is a baseline sample that is not treated with phosphoric acid. Samples 3-2 through 3-6 are treated with increasing doses of phosphoric acid, from 1.0% to 10.0% by weight, respectively.

Row 316 provides the activation yield, which increases with increasing phosphoric acid treatment doses. Row 318 provides the Vibrating Feed Density, which generally increases with increasing phosphoric acid dosage. Row 320 provides final ash by weight, which remains relatively unchanged with increasing acid dose. Ash levels in activated carbons may be determined in accordance with ASTM Standard D2866 or similar procedures. In various embodiments, final ash may remain relatively unchanged under these activation conditions (in contrast to the decreasing ash levels associated with 60 minutes of activation as discussed in conjunction with FIG. 2A), because enough carbon burn-off may occur during mesoporosity development, even with phosphoric acid application, to produce a final ash concentration in the AC that is similar to the final concentrations found in ACs that have not been treated with phosphoric acid prior to activation.

Row 322 provides the pH of each Sample. As expected, pH decreases with increasing phosphoric acid dose, because the application of acid neutralizes the basic mineral constituents of the AC. Row 324 provides water solubles, which also decrease with increasing phosphoric acid dosage. Row 326 provides final phosphates by weight percentage. Phosphates do not increase with additional acid dosage. This may be important, because an increase in extractable phosphate could restrict the use of ACs in certain water treatment applications. To evaluate phosphate levels, a sample of activated carbon is boiled in distilled water to remove water soluble phosphate salts. The slurry is filtered, and a portion of the filtrate analyzed for phosphate content by a standard method.

Row 328 provides Molasses RE, which decreases consistently with increasing acid dose. Row 330 provides BPB Number, which drops in comparison to Sample 3-1 with the initial acid dose, but then increases with increasing acid dose from Sample 3-2 to Sample 3-6. Sample 3-6, with 10.0% acid dose, has a BPB Number of 101, slightly below that of the 106 BPB Number of untreated Sample 3-1. Even though macroporosity does not recover, it appears that with a 10.0% phosphoric acid dose, mesoporosity as measured by BPB Number may recover to a level similar to that of Sample 3-1. This recovery of BPB Number may be due to an alteration in the activation process that facilitates more mesopore development as more acid is applied. Phosphoric acid slows down the activation reaction rate, which may allow more micropores to develop than what is normally observed in untreated AC, before some of these micropores are converted to mesopores. Building on this, the slowed reaction rate may allow more mesopores to develop than may be normally observed in untreated AC, before some of these mesopores are converted to macropores. The end result is an increase in microporosity and mesoporosity as acid is added.

Row 332 provides Iodine Number, which increases with acid dosage, confirming an increase in microporosity.

Table 340 (FIG. 3B) provides data for samples activated for 45 minutes. Columns 342 through 348 provide data on Samples 3-7 through 3-10, respectively. Row 350 provides the phosphoric acid treatment dose for each Sample. Sample 3-7 is a baseline sample that is not treated with phosphoric acid. Samples 3-8, 3-9, and 3-10 are treated at increasing doses, from 5.0% to 10.0% by weight, respectively.

Row 352 provides the activation yield, which generally increases with phosphoric acid treatment. Row 354 provides the Vibrating Feed Density, which drops with acid treatment in comparison to untreated Sample 3-7, but increases slightly with increasing acid dosage. Row 356 provides final ash by weight, which decreases significantly with acid treatment in comparison to untreated Sample 3-7, but remains generally constant for all acid doses. These activation conditions reduce the untreated lignite to 75.29% ash, which explains Sample 3-7's decreased adsorptive capacity values described below. The ash levels of the treated Samples may also be elevated in comparison to other non-treated ACs, and this increase may be due to the development of more porosity along a greater range of pores, thus allowing more carbon to burn-off in the treated samples.

Row 358 provides water solubles, which slightly increase with acid dose. Yet, as water solubles levels generally remain low, presumably this AC would actually have a greater effective purity, at least concerning certain water based applications. Further, in various embodiments, with less material leaching off the AC into the water, fewer contamination issues may occur. In particular, there may be a reduction in scaling tendencies, because the reduced pH value of the treated lignite-based AC, due to acidification, may reduce the scaling potential of the calcium component of the AC. In addition, because water soluble calcium components are bound to the carbon structure of the acid treated lignite-based AC as insoluble phosphates, they do not go into the water and come back out at scale.

Row 360 provides Molasses RE, which drops slightly across treated Samples 3-8, 3-9, and 3-10, in comparison to untreated Sample 3-7. Row 362 provides BPB Number, which significantly increases for treated Samples 3-8, 3-9, and 3-10, in comparison to untreated Sample 3-7. Row 364 provides Iodine Number, which also significantly increases for treated Samples 3-8, 3-9, and 3-10 in comparison with untreated Sample 3-7. Overall, the acid treated AC under these activation conditions appears to have performance characteristics similar to bituminous coal-based AC, which may have economic and/or logistical benefits in various applications.

Table 370 (FIG. 3C) provides data for samples activated for 60 minutes. Columns 372 through 378 provide data on Samples 3-11 through 3-14, respectively. Row 380 provides the phosphoric acid treatment dosage for each Sample. Sample 3-11 is a baseline sample that is not treated with phosphoric acid. Samples 3-12, 3-13, and 3-14 are treated at increasing dosages, from 5.0% to 10.0% by weight, respectively.

Row 382 provides the activation yield, which significantly increases for treated Samples 3-12, 3-13, and 3-14 in comparison to untreated Sample 3-11. Row 384 provides the Vibrating Feed Density, which drops for treated Samples.

Row 386 provides the final ash by weight. These activation conditions essentially reduce the untreated lignite to ash. Sample 3-11 is 99.23% ash, explaining the adsorptive capacity characteristics of Sample 3-11, which are even lower than the values of untreated Sample 3-7 discussed in conjunction with Table 340. Again, the ash values of treated Samples 3-12, 3-13, and 3-14, similar to the treated samples discussed in conjunction with Table 340, have elevated ash levels over certain non-treated ACs. This increase in ash may be due to the development of more porosity along a greater range of pore sizes, especially since significant macroporosity may be developed, thus more carbon may be burned off than for non-treated ACs.

Row 388 provides water solubles, which decrease generally from the levels in untreated ACs (note, no value for Sample 3-11 is available). This decrease in water solubles may maintain effective purity of the AC in relation to various water based applications.

Row 390 provides Molasses RE, which decreases for treated Samples 3-12, 3-13, and 3-14 in comparison to Sample 3-11. The Molasses RE and Vibrating Feed Density values produced by acid treatment is similar to other non-treated ACs, confirming that the use of acid treatment may not preclude the development of significant macroporosity in various embodiments.

Row 392 provides BPB Number and Row 394 provides Iodine Number. Both significantly increase with acid dose.

FIGS. 4A and 4B illustrate the relationship between a hydrochloric acid wash and Iodine Number in accordance with particular embodiments. FIG. 4A includes Table 400 and FIG. 4B includes Table 450. Table 400 provides comparative data on AC samples. Columns 402 through 406 provide data on Samples 4-1 through 4-3, respectively. Sample 4-1 is an AC that has not been treated with phosphoric acid. Sample 4-2 was treated with phosphoric acid, in a process similar to process discussed in conjunction with FIG. 1A, and was activated for 60 minutes at approximately the same temperature as the samples described in FIGS. 3A, 3B, and 3C. Sample 4-3 was similarly treated with phosphoric acid and activated. Following activation, Sample 4-3 was washed with a 7% hydrochloric acid solution, similar to the washing process discussed in conjunction with FIG. 1A. As Row 410 indicates, neither Sample 4-1 nor Sample 4-2 were exposed to hydrochloric acid.

Rows 414, 416, and 418 provide adsorptive capacity measures, Molasses RE, BPB Number, and Iodine Number, respectively. Comparing Sample 4-3 to Sample 4-2 and to Sample 4-1, it is evident that hydrochloric acid washing results in improvements when compared to phosphoric acid treatment alone in each adsorptive capacity category—macroporosity, mesoporosity, and microporosity—and significant improvements when compared to traditional, non-treated AC. Washing a phosphoric acid treated AC with a hydrochloric acid solution may also result in a very low Tannin Value, an adsorptive capacity measurement linked to performance in the water treatment market. Tannin Values may be determined in accordance with American Water Works Association ("AWWA") Standard B600-78 or similar procedures.

Following hydrochloric acid washing, Sample 4-3 had a Tannin Value of approximately 100. Tannic acid has been said to be representative of large organics normally found in water sources. Sample 4-3's Tannin Value is better than that typically found in many varieties of wood-based AC, which often have Tannin Values over 100. The improvement in Tannin Value may not be seen in lignite-based ACs that are not treated with phosphoric acid and/or hydrochloric acid.

Table 450 (FIG. 4B) provides additional comparative data on hydrochloric acid washing. Column 452 provides data on Sample 4-4, a conventional, chemically activated, wood-based AC sample. Column 454 provides data on Sample 4-5, a lignite-based AC treated with 10% phosphoric acid, activated, and then washed with hydrochloric acid. Sample 4-5 has lower acid soluble ash and water soluble content, including phosphates and higher porosity than Sample A. Rows 460, 462, and 464 provide acid soluble ash, water soluble content, and water soluble phosphates, all of which are purity indicators. Each demonstrates an improvement for the phosphoric acid treated, hydrochloric acid washed lignite-based AC in comparison to the activated, wood-based AC sample. Rows 466, 468, and 470 provide Molasses RE, Iodine Number, and BPB Number, which, as described previously, measure adsorptive capacity. These measures also indicate an improvement for the PAT, hydrochloric acid washed lignite-based AC in comparison to the wood-based AC. These improvements demonstrate an increase in porosity—macroporosity, mesoporosity, and microporosity, respectively—that may make it possible to use this or similar PAT, hydrochloric acid washed ACs in high-value markets traditionally occupied by wood-based ACs, for example the sugar, alcohol, pharmaceuticals, and/or chemical markets. Additionally, in various embodiments, PAT, hydrochloric acid washed lignite-based ACs may demonstrate improved abrasion resistance, which may make these or similar ACs appropriate for usage in gas and/or air purification markets.

Figures 5A, 5B:
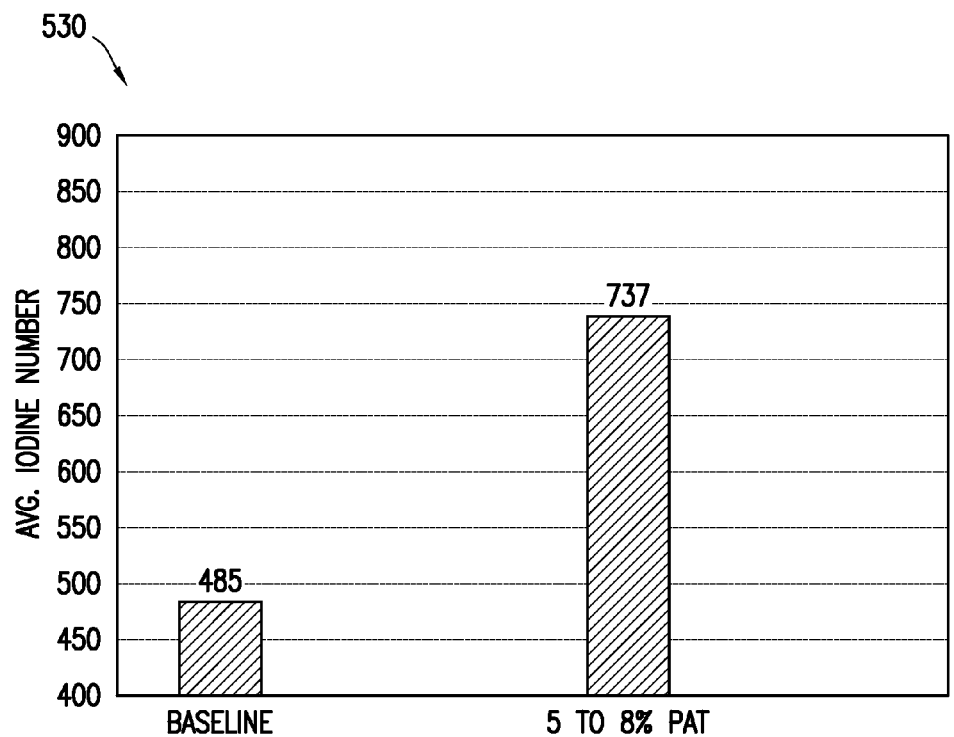
FIGS. 5A and 5B also illustrate the relationship between phosphoric acid treatment and Iodine Number in accordance with particular embodiments.

FIGS. 5A and 5B also illustrate the relationship between phosphoric acid treatment and Iodine Number in accordance with particular embodiments. FIG. 5A includes Table 500 and FIG. 5B includes Graph 530. Table 500 provides data corresponding to PAT lignite-based AC samples, treated and activated in a process similar to the process discussed in conjunction with FIG. 1A. Activation temperatures were similar to the activation temperature of the samples described in FIGS. 2A and 2B. Columns 502 through 508 provide data on Samples 5-1 through 5-4, respectively. Samples 5-1 through 5-4 were each taken for testing directly from a kiln, similar to the kiln described in conjunction with FIG. 1A. Testing of samples taken from the same kiln prior to the testing of any PAT lignite-based AC samples established a kiln-specific, average Iodine Number of 485.

Row 510 provides kiln hood temperatures, similar to the activation temperature of the samples described in FIGS. 2A and 2B, which varied over about 50° C. Row 512 provides phosphoric acid doses, which also remain relatively constant between 8% and 9%, with a slight variation for Sample 5-4 at 6.3%. Row 514 provides activation yields, which vary from 11.5% to 15.4%. Row 516 provides BPB Numbers, which vary from 201 to 144. Row 518 provides Iodine Numbers, which remain consistently above the non-PAT value of 485, varying from 713 to 744. These measurements were made at the time directly after the samples were removed from the kiln. In various embodiments, the values may provide an even greater change from the baseline value of 485, because there may be a delay in time before a kiln product, the activated sorbent, exhibits the full effect of phosphoric acid treatment and activation.

Graph 530 illustrates the change in average Iodine Number between non-PAT AC activated in this kiln and the average Iodine Number of Samples 5-1 through 5-4. The average of Samples 5-1 through 5-4, approximately 740, is almost a 53% increase in Iodine Number over the established baseline. In various embodiments, PAT doses as low as 2.4% may still produce a significant Iodine Number increase from the kiln non-PAT baseline. In certain embodiments, PAT doses over 8% produce significant increases in Iodine Number as well.

FIG. 6 also illustrates the relationship between phosphoric acid treatment and Iodine Number in accordance with particular embodiments. Table 600 provides comparative data for two ACs. Column 602 provides data on Sample 6-1, which is lignite furnace product ("LFP"), a contemporary AC commonly used as a baseline AC for research, that has not been treated with phosphoric acid. Column 604 provides data on Sample 6-2, which is a phosphoric acid treated lignite-based AC, treated and activated in a similar way to the process discussed in conjunction with FIG. 1A. Row 610 provides water solubles, which drop considerably for the phosphoric acid treated lignite-based AC. Row 614 provides Molasses RE, which increases for the phosphoric acid treated lignite-based AC. Rows 616 and 618 provide BPB Number and Iodine Number, respectively, which both increase for the phosphoric acid treated AC. Finally, row 620 provides Abrasion Number, a measurement of abrasion resistance (i.e., increased hardness), which also significantly improves for the phosphoric acid treated lignite-based AC. A sample's Abrasion Number may be determined in accordance with ASTM Standard D3802 or similar procedures.

The data from Table 600, and other tables discussed herein, demonstrate an increase in the Iodine Number and BPB Number, and thus, the microporosity and mesoporosity of a lignite-based AC, when treating the lignite with phosphoric acid prior to activation. Treating the lignite with phosphoric acid through a process similar to the process described in FIG. 1A may also produce significant increases in abrasion resistance and decreases in water solubles associated with the AC. In various embodiments, manipulations of the dose of phosphoric acid and the activation yield may impact the quality and/or performance of the phosphoric acid treated lignite-based AC.

Figures 7A, 7B:
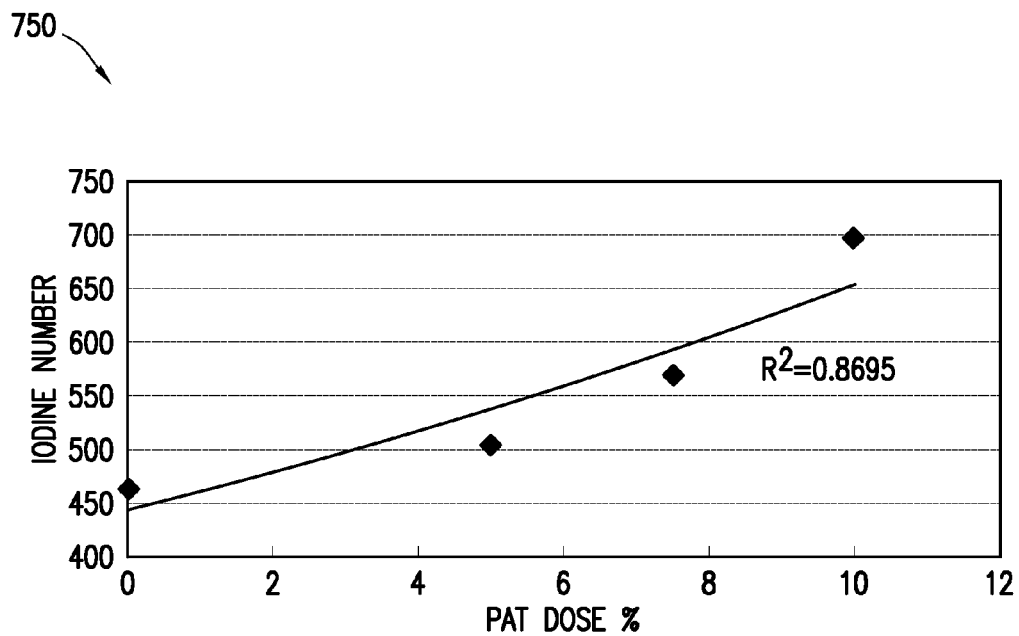
FIGS. 7A and 7B illustrate the relationship between phosphoric acid treatment and Iodine Number for high ash lignite-based AC in accordance with particular embodiments.

FIGS. 7A and 7B illustrate the relationship between phosphoric acid treatment and Iodine Number for lignite-based AC derived from a higher ash starting material that those discussed in conjunction with FIGS. 2 through 6 and activated in accordance with particular embodiments. FIG. 7A includes Table 700 and FIG. 7B includes Graph 750.

Table 700 provides data on high ash lignite-based AC activated in a batch activation process for 60 minutes at approximately the same temperature as the samples described in FIGS. 2A and 2B. Columns 702 through 708 provide data on Samples 7-1 through 7-4, respectively. Row 710 provides phosphoric acid dosage levels. Sample 7-1 does not receive any phosphoric acid treatment. Samples 7-2, 7-3, and 7-4 were treated with increasing doses of phosphoric acid prior activation.

Row 712 provides activation yield, which increases with increasing phosphoric acid dosage. Row 714 provides the Vibrating Feed Density, which increased for each PAT sample in comparison to Sample 7-1. Row 716 provides final ash, which decreased for each PAT sample in comparison to Sample 7-1. The reduction in ash may be caused by a reduction of the activation reaction rate, thus slowing the carbon burn-off rate and slowing the development of macroporosity. Row 718 provides water solubles, which decrease for each PAT sample in comparison to Sample 7-1. The decrease in water solubles may occur because the phosphoric acid reacts with the mineral ash constitutes in the lignite to form sparingly soluble phosphates (primarily calcium, sodium, and potassium phosphates). This may also explain why PAT lignite-based AC may not increase water extractable phosphates in certain embodiments. Less water soluble compounds may wash off the AC in water based applications, potentially reducing scaling and ash extractable issues.

Rows 720 and 722 provide Molasses RE and BPB Number, which both generally decrease. Row 724 provides Iodine Number, which significantly increases with phosphoric acid dosage. These results are very similar to those seen when PAT was used with low ash lignite-based AC as discussed in conjunction with FIGS. 2A and 2B, indicating that high ash content in raw lignite did not prevent PAT from increasing Iodine Number. The results shown in FIG. 5A demonstrate that increasing the extent of activation may further increase mesoporosity as measured via the BPB number. The AC produced with a 10% phosphoric acid dose in both Tables 700 and 200 may be representative of an AC useful for the water market or the coal fired utility market, for example in power plants, cement kilns, and other industrial boilers, because the increased yield would mitigate the cost of using phosphoric acid in the activation process.

Graph 750 (FIG. 7B) presents a possible exponential relationship between Iodine Number and phosphoric acid dose from Table 700. Complicating factors may exist, such as non-productive reaction of the phosphoric acid with impurities in the lignite rather than with catalyst minerals or the carbon structure itself. Thus a certain amount of phosphoric acid must be applied to overcome these complicating factors before enough is left to react in ways that are productive to increased microporosity development. The use of washing to reduce the ash content of the lignite prior to PAT may reduce these complicating factors and increase the effectiveness of PAT or reduce the phosphoric acid dose necessary to achieve Iodine Number improvement.

FIG. 8 illustrates the influence of activation temperature for high ash lignite-based AC in accordance with particular embodiments. Table 800 provides data on high ash lignite-based AC treated with a 10% phosphoric acid treatment and activated for 60 minutes in a batch activation process, which, similar to the process described in conjunction with FIG. 1A, treats the high ash lignite-based AC with phosphoric acid prior to steam activation.

Columns 802 and 804 provide data on Samples 8-1 and 8-2, respectively. Samples 8-1 and 8-2 underwent similar activation processes, but were activated at different temperatures. Sample 8-1 was activated at approximately the same temperature as the samples described in FIGS. 2A and 2B. Sample 8-2 was activated at approximately 100° C. higher than Sample 8-1. Row 812 provides activation yields, which decrease with increased activation temperature. Row 812 provides the Vibrating Feed Densities, which decrease with temperature. Row 816 provides the percentages of final ash by weight, which increase with temperature, possibly indicating additional carbon burn-off. Row 818 provides water solubles, which remain relatively unchanged. Row 820 and Row 822 provides Molasses RE and BPB Numbers, which both increase significantly with temperature, indicating the development of macroporosity and mesoporosity during activation. Row 824 provides Iodine Numbers, which, like water soluble content, remain relatively unchanged with an increase in temperature. In various embodiments, as the phosphoric acid reacts with some portion of the catalytic minerals present in the lignite, converting the minerals to a non-catalytic or reduced catalytic state, the overall rate of pore development decreases. This may allow micropores to develop early in the activation process. As the activation process continues, these micropores may develop into mesopores and subsequently macropores, while more micropores may continue to develop. In certain embodiments, this reduced pore development rate may allow for the carbon structure to be more efficiently activated, without over-rapid burnout and waste of carbon, thus, possibly producing more porosity overall. These results indicate that increasing the activation temperature may be an effective means to generate macroporosity in a phosphoric acid treated AC. In certain embodiments, activating PAT AC produced at an increased activation temperature may produce a product suitable for certain water treatment markets where a higher cost lignite AC with superior adsorptive capacity is justified. In various embodiments, an increased activation temperature sufficient to produce an improvement in BPB number may provide a benefit to mercury adsorption in the coal fired utility market.

FIG. 9 illustrates a comparison between wood-based AC and PAT lignite-based AC. Table 900 provides data on hydrochloric acid washing, similar to data presented in Table 450.

Column 902 provides data on Sample 9-1, which is Norit C-Gran, a chemically activated, wood-based AC. Column 904 provides data on Sample 9-2, a lignite-based AC, which was treated with 10% phosphoric acid, activated at approximately the same temperature as the samples described in FIGS. 3A, 3B, and 3C, and washed with 7% hydrochloric acid after activation in a process similar to the one described in conjunction with FIG. 1A.

Row 910 provides data on percentage of final ash by weight, which increased significantly for Sample 9-2. The ash levels of Sample 9-2 may be elevated in comparison to Sample 9-1, due to the development of more porosity along a greater range of pores, thus allowing more carbon to burn-off in Sample 9-2. Row 912 provides average acid soluble ash, which decreases significantly for Sample 9-2. Further, Row 914 provides average acid solubles, which remain relatively similar between samples. Acid solubles may be calculated by determining the weight of material extracted from a sorbent sample as a percentage of the total weight of the sorbent sample. Acid solubles may be generally extracted from a sorbent sample by boiling the sample with a hydrochloric acid solution that is equal parts distilled water and concentrated reagent grade hydrochloric acid, evaporating the resulting filtrate, and drying the residue an oven.

The similarity between Samples 9-1 and 9-2 may indicate that in various embodiments, in addition to performance enhancements, Sample 9-2 or similar samples may be suitable for many of the same applications where chemically activated wood-based ACs are currently used on the basis of purity as well.

Row 916 provides water solubles for each sample and shows a significant reduction in water solubles for Sample 9-2. Row 918 provides Molasses RE, which are similar for both samples. Rows 920 and 922 provide Iodine Numbers and BPB Numbers, respectively, which both significantly increase for Sample 9-2. In various embodiments, based on these adsorptive capacity indicators, Sample 9-2 or similar samples may be used in applications that currently use chemically activated wood-based ACs. This may provide economic, logistical, or other advantages, since the production capacity is limited for wood-based ACs suitable for chemical activation.

FIG. 10 illustrates the relationship between phosphoric acid treatment and mercury capacity in accordance with particular embodiments. Table 1000 provides performance data on mercury capacity. Column 1002 provides data on Sample 10-1, a standard lignite-based AC. Columns 1004 and 1006 provide data on Samples 10-2 and 10-3, phosphoric acid treated lignite-based ACs. Row 1010 provides the phosphoric acid dose. Sample 10-2 received a 1% dose by weight and Sample 10-3 received a 7.5% dose by weight of an 85% phosphoric acid solution.

Rows 1012, 1014, and 1016 provide data on Molasses RE, BPB Number, and Iodine Number. Sample 10-2 provides at least a minimal increase from Sample 10-1, whereas Sample 10-3 provides a significant increase for each characteristic.

Rows 1018 and 1020 provide data on the mercury capture of the samples in a lab scale, fixed-bed mercury analyzer. In general, the laboratory apparatus includes a fixed-bed reactor, which is created by mixing 2.5 milligrams of the sorbent sample, in powdered form, with 5 grams of sized and purified sand and packed into a glass tube reactor. In order to predict more accurately the likely adsorption of the sorbent sample, the temperatures of the fixed-bed apparatus and the elemental mercury loaded air are selected to closely simulate the conditions at which the sorbent is likely to be injected into a flue gas stream. In this testing, the apparatus was maintained at approximately 325° F.

The bed is exposed to a simulated air stream containing a known concentration of elemental mercury ($Hg^0$) using laboratory purified air as the carrier gas. Mercury in the air outlet stream is converted to elemental mercury by a thermal mercury converter, operated at a temperature of approximately 1400° F. The inlet and outlet elemental mercury concentrations are continuously measured by an analyzer operable to measure the concentration of elemental mercury. Comparing the elemental mercury in the outlet stream to the elemental mercury in the inlet stream, it is possible to calculate the total or cumulative amount of elemental mercury adsorbed by a sorbent by integrating the difference between the inlet and outlet elemental mercury concentration versus time using the trapezoidal rule. This cumulative value is also known as the equilibrium adsorption capacity.

Both Samples 10-2 and 10-3 demonstrate significant increases in mercury capacity. These improvements may be caused by alterations in the surface chemistry of the phosphoric acid treated AC, which may aid in mercury capture. As discussed in conjunction with FIGS. 4A and 4B and FIG. 9, treating the AC with hydrochloric acid may further increase adsorptive capacity characteristics important for mercury capacity. These data, showing improvements in mercury adsorption in accordance with certain embodiments, demonstrate that utilizing phosphoric acid treated lignite-based ACs may provide efficiency, economic, logistical, and other advantages in comparison to other untreated ACs. In certain embodiments, similar advantages may also be realized from the application of a phosphoric acid treatment prior to activation to other raw materials, including without limitation, peat, wood, lignocellulosic materials, biomass, waste, tire, corn hulls, rice hulls, petroleum coke, various coals, such as brown coal, anthracite coal, bituminous coal, and sub-bituminous coal, various nut-shells, such as pecan shells and walnut shells, and materials from various drupes, such as coconut shells, olive pits, and peach pits.

Figures 11A, 11B:
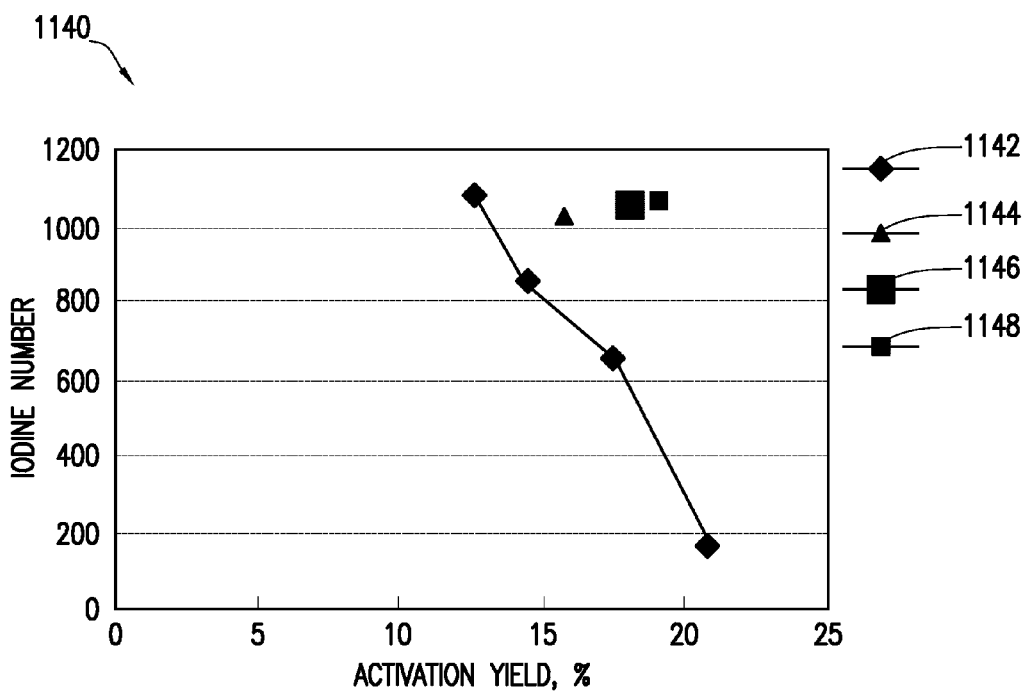
FIGS. 11A, 11B, and 11C illustrate the relationship between phosphoric acid treatment, activation yield, and Iodine Number in accordance with particular embodiments.
Figure 11C:
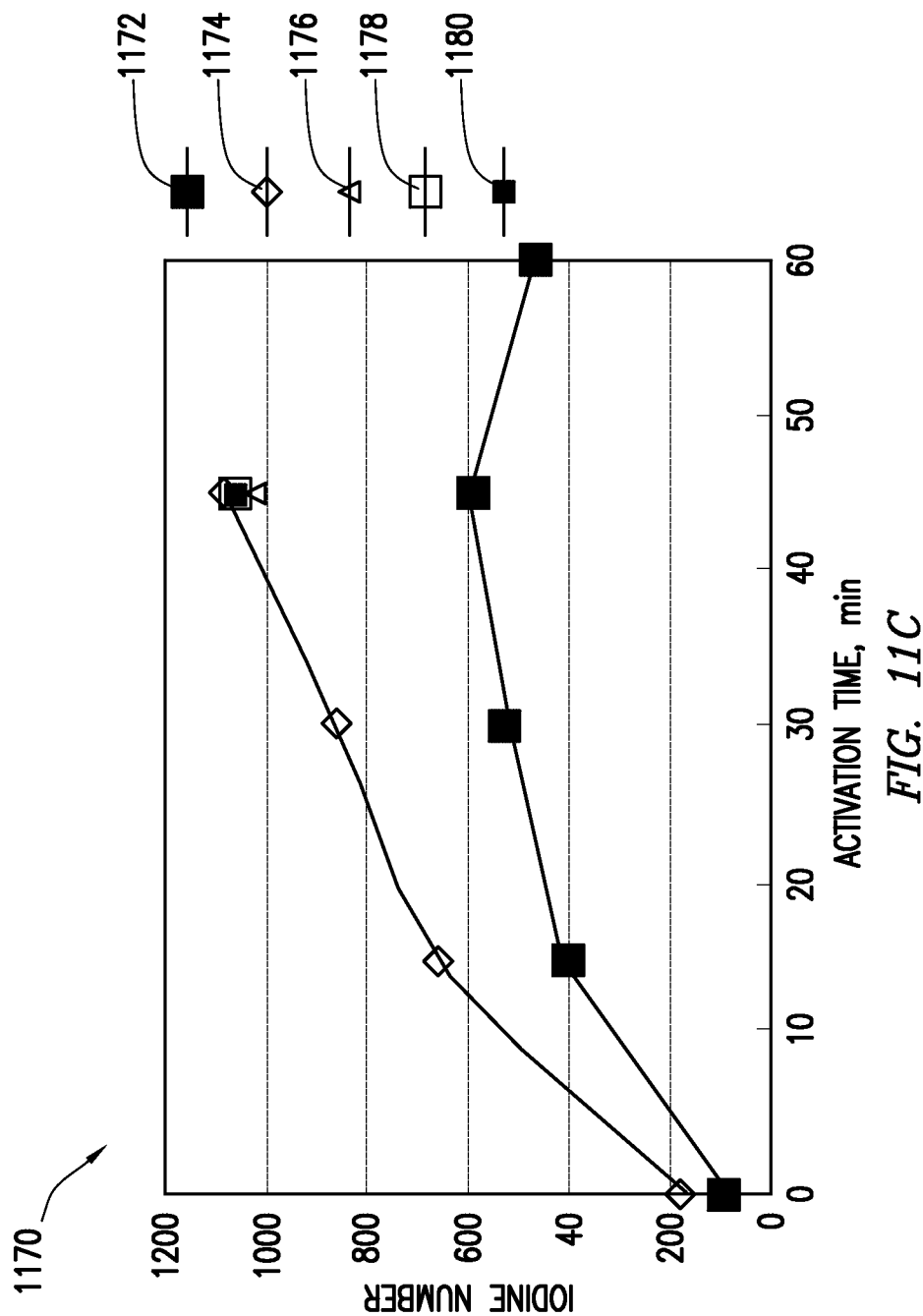

FIGS. 11A, 11B, and 11C illustrate the relationship between phosphoric acid treatment, activation yield, and Iodine Number in accordance with particular embodiments. FIG. 11A includes Table 1100, FIG. 11B includes Graph 1140, and FIG. 11C includes Graph 1170, which collectively provide data corresponding to a series of walnut shell-based AC samples activated in a process similar to system 100 as described in FIG. 1A. Activation in a kiln, similar to kiln 130 described in FIG. 1A, occurred for 45 minutes at a temperature approximately the same as the activation temperature for the samples described in FIGS. 2A and 2B.

Table 1100 provides data on Samples 11-1 through 11-4, illustrated in columns 1102 through 1108, respectively. Row 1110 provides the phosphoric acid treatment dose for each Sample. Sample 11-1 is a baseline sample that was not treated with phosphoric acid. Samples 11-2 though 11-4 are treated with increasing doses of phosphoric acid from 1% to 5% by weight, respectively. As explained previously, the phosphoric acid dose weight percentage is a measurement of the aqueous solution containing the phosphoric acid with respect to the starting material, and not a measurement of the weight of the phosphoric acid in the solution.

Row 1112 provides the activation yield, which increases as the phosphoric acid dose increases. Row 1114 provides the Iodine Number, which is an indication of microporosity. Iodine Number remains relatively constant across all samples. These data indicate that it is possible to significantly increase the activation yield of walnut shell-based AC through phosphoric acid treatment prior to activation, without compromising the Iodine Number of the AC.

In particular embodiments, washing the PAT walnut shell-based AC with hydrochloric acid may result in additional improvements in the AC's performance characteristics. For example, washing Sample 11-4 with a solution of 7% hydrochloric acid by weight results in an increase in Iodine Number to approximately 1129.

Graph 1140 (FIG. 11B) illustrates the relationship between activation yield and Iodine Number. Data points 1142 represent a untreated, walnut shell-based AC. As activation yield increases from 12.5% to 20.7% by weight, Iodine Number falls dramatically from 1083 to 178, respectively. This drop off in Iodine Number indicates a significant reduction in microporosity as the activation yield increases.

Data points 1144, 1146, and 1148 represent PAT walnut shell-based ACs. Data point 1144 represents a walnut-shell based AC, treated with a 1% dose of phosphoric acid prior to activation. Data point 1144 represents a walnut-shell based AC, treated with a 2.5% dose of phosphoric acid prior to activation. Data point 1146 represents a walnut-shell based AC, treated with a 5% dose of phosphoric acid prior to activation. Despite improvements above 12.5% in activation yield for each of these samples, Iodine Number remains consistently above 1000.

Graph 1170 (FIG. 11C) illustrates the relationship between activation time and Iodine Number. Data points 1172 represent an untreated, lignite-based AC. Data points 1174 represent an untreated, walnut-based AC. Data points 1176, 1178, and 1180 represent PAT walnut-shell based ACs. Data point 1176 represents a walnut-shell based AC, treated with a 1% dose of phosphoric acid prior to activation. Data point 1178 represents a walnut-shell based AC, treated with a 2.5% dose of phosphoric acid prior to activation. Data point 1180 represents a walnut-shell based AC, treated with a 5% dose of phosphoric acid prior to activation. All walnut-shell ACs show a superiority in Iodine Number over lignite as the activation time increase. Additionally, the PAT walnut-based ACs exhibit similar Iodine Numbers to the untreated, walnut-shell based AC after 45 minutes of activation time. This parity, when considered in combination with the improvements in activation yield for PAT walnut-based AC, as described conjunction in Table 1100 and Graph 1140, indicates that treating walnut shells with phosphoric acid prior to activation may provide significant advantages in yield without compromising performance. These advantages may translate into important economic, environmental, and logistical benefits.

Particular embodiments of the present disclosure may provide one or more technical advantages. A technical advantage of one embodiment may include increasing the adsorptive capacity characteristics of an AC, or maintaining the adsorptive capacity characteristics while increasing the activation yield. Increasing the adsorptive capacity characteristics, for example, increasing the microporosity or mesoporosity of an AC, may improve the performance such that the AC may be used in applications requiring microporosity and/or mesoporosity, such as applications requiring the removal of small molecular weight impurities. Using an AC treated with phosphoric acid prior to activation in accordance with certain embodiments may have economic, processing, performance, logistical, safety, environmental, efficiency, sourcing, and/or other desirable advantages. An additional technical advantage of one embodiment may be a reduction or elimination in facility corrosion or damage caused by phosphoric acid, and may additionally or alternatively provide additional economic, safety, logistical, or other advantages. Technical advantages of phosphoric acid treatment prior to activation may also include the ability to direct-activate raw materials that commonly require agglomeration or grinding and reagglomeration prior to activation.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of producing an activated carbon, comprising: selecting a raw material for direct-activation; applying a solution of at least 50% phosphoric acid by weight at a ratio of from 0.01 pounds to 0.3 pounds of phosphoric acid solution per pound to the raw material selected for direct activation to produce a phosphoric acid treated raw material; and direct-activating the phosphoric acid treated raw material via a gas activation process to produce an activated carbon.

2. The method of claim 1, wherein the raw material is selected from the group consisting of peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells.

3. The method of claim 1, wherein the raw material comprises lignite.

4. The method of claim 1, further comprising, after direct-activating the phosphoric acid treated raw material, washing the activated carbon with a solution comprising a second acid.

5. The method of claim 4, wherein the solution comprising the second acid comprises at least 1% hydrochloric acid by weight.

6. The method of claim 1, wherein applying the solution of at least 50% phosphoric acid by weight at a ratio of from 0.01 pounds to 0.3 pounds of phosphoric acid solution per pound to the raw material comprises spraying the solution on the raw material.

7. The method of claim 1, wherein the gas activation comprises exposing the raw material to steam at a temperature of at least 600° C.

8. A method to produce lignite-based activated carbon comprising: applying a solution of at least 50% phosphoric acid by weight at a ratio of from 0.01 pounds to 0.3 pounds of phosphoric acid solution per pound to the lignite to produce a phosphoric acid treated lignite; and activating the phosphoric acid treated lignite via a gas activation process, the gas activation comprising exposing the phosphoric acid treated lignite to steam at a temperature of at least 600° C.; and optionally washing the resulting material with a solution comprising at least 1% hydrochloric acid by weight.

9. A method to produce walnut shell-based activated carbon comprising: applying a solution of at least 50% phosphoric acid by weight at a ratio of from 0.01 pounds to 0.3 pounds of phosphoric acid solution per pound to walnut shell pieces to produce phosphoric acid treated walnut shells; and activating the phosphoric acid treated walnut shells via a gas activation process, the gas activation comprising exposing the phosphoric acid treated walnut shells to steam at a temperature of at least 600° C.; and optionally washing the resulting material with a solution comprising at least 1% hydrochloric acid by weight.

10. The method of claim 1, wherein the produced activated carbon has an ash content greater than 29 weight percent.

* * * * *